(12) United States Patent
Nakura et al.

(10) Patent No.: US 8,565,601 B2
(45) Date of Patent: Oct. 22, 2013

(54) COMMUNICATION METHOD FOR OPTICAL COMMUNICATION SYSTEM, OPTICAL COMMUNICATION SYSTEM, SLAVE STATION APPARATUS, CONTROL DEVICE, AND COMPUTER PROGRAM

(75) Inventors: Kenichi Nakura, Tokyo (JP); Hiroaki Mukai, Tokyo (JP); Seiji Kozaki, Tokyo (JP); Daisuke Ito, Tokyo (JP); Masaki Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/695,554

(22) PCT Filed: Dec. 8, 2010

(86) PCT No.: PCT/JP2010/007128
§ 371 (c)(1),
(2), (4) Date: Oct. 31, 2012

(87) PCT Pub. No.: WO2012/077161
PCT Pub. Date: Jun. 14, 2012

(65) Prior Publication Data
US 2013/0045005 A1 Feb. 21, 2013

(51) Int. Cl.
*H04B 10/00* (2013.01)
(52) U.S. Cl.
USPC .............................. 398/72; 398/66; 398/140
(58) Field of Classification Search
USPC ............................................ 398/66–72, 140
See application file for complete search history.

(56) References Cited

U.S. PATENT DOCUMENTS

| | | | | |
|---|---|---|---|---|
| 7,103,073 | B2 * | 9/2006 | Bernard et al. | 370/503 |
| 7,525,982 | B2 * | 4/2009 | Kramer et al. | 370/431 |
| 7,545,813 | B2 * | 6/2009 | Davis et al. | 370/395.4 |
| 7,660,333 | B2 * | 2/2010 | DeLew et al. | 370/516 |
| 7,929,576 | B2 * | 4/2011 | Boyd et al. | 370/505 |
| 8,000,602 | B2 * | 8/2011 | Haran et al. | 398/72 |
| 8,275,261 | B2 * | 9/2012 | Mandin et al. | 398/72 |

(Continued)

FOREIGN PATENT DOCUMENTS

| JP | 2006 41807 | 2/2006 |
|---|---|---|
| JP | 2007 274534 | 10/2007 |

(Continued)

OTHER PUBLICATIONS

U.S. Appl. No. 13/698,509, filed Nov. 16, 2012, Mukai, et al.

(Continued)

*Primary Examiner* — Agustin Bello
(74) *Attorney, Agent, or Firm* — Oblon, Spivak, McClelland, Maier & Neustadt, L.L.P.

(57) ABSTRACT

The control device includes a power-saving control unit that intermittently repeats, based on a power saving permission signal transmitted from the master station apparatus, power saving control in which the slave station stops or reduces power supply to a transmitter or a receiver for a predetermined pause duration while maintaining a communication link and a monitoring unit that monitors out of synchronization by comparing a synchronization signal received from the OLT and a time of the ONU. The control device shifts from a registered state to a deregistered state when the monitoring unit detects the out of synchronization. On the other hand, after the pause duration of the power saving control, the control device suppresses the shift to the deregistered state due to the detection of the out of synchronization.

24 Claims, 13 Drawing Sheets

(56) References Cited

U.S. PATENT DOCUMENTS

| | | | |
|---|---|---|---|
| 8,284,794 B2* | 10/2012 | Yu et al. | 370/464 |
| 8,335,235 B2* | 12/2012 | Davis et al. | 370/474 |
| 8,422,887 B2* | 4/2013 | Haramaty et al. | 398/151 |
| 2006/0029389 A1* | 2/2006 | Cleary et al. | 398/33 |
| 2006/0093356 A1* | 5/2006 | Vereen et al. | 398/33 |
| 2007/0014575 A1* | 1/2007 | Kramer et al. | 398/71 |
| 2008/0212964 A1* | 9/2008 | Gao et al. | 398/58 |
| 2009/0067835 A1* | 3/2009 | Chen | 398/45 |
| 2009/0263127 A1* | 10/2009 | Haran et al. | 398/38 |
| 2010/0098407 A1* | 4/2010 | Goswami et al. | 398/5 |
| 2010/0118753 A1* | 5/2010 | Mandin et al. | 370/311 |
| 2010/0266280 A1* | 10/2010 | Yamashita | 398/58 |
| 2010/0316387 A1* | 12/2010 | Suvakovic | 398/98 |
| 2011/0188849 A1* | 8/2011 | Haramaty et al. | 398/25 |
| 2013/0045005 A1* | 2/2013 | Nakura et al. | 398/25 |
| 2013/0045010 A1* | 2/2013 | Mukai | 398/52 |

FOREIGN PATENT DOCUMENTS

| | | |
|---|---|---|
| JP | 2009 260970 | 11/2009 |
| JP | 2010 114830 | 5/2010 |
| JP | 2010 213259 | 9/2010 |
| JP | 2010 239278 | 10/2010 |

OTHER PUBLICATIONS

International Search Report Issued Mar. 15, 2011 in PCT/JP10/007128 Filed Dec. 8, 2010.

International Search Report Issued Mar. 15, 2011 in PCT/JP10/07128 Filed Dec. 8, 2010.

* cited by examiner

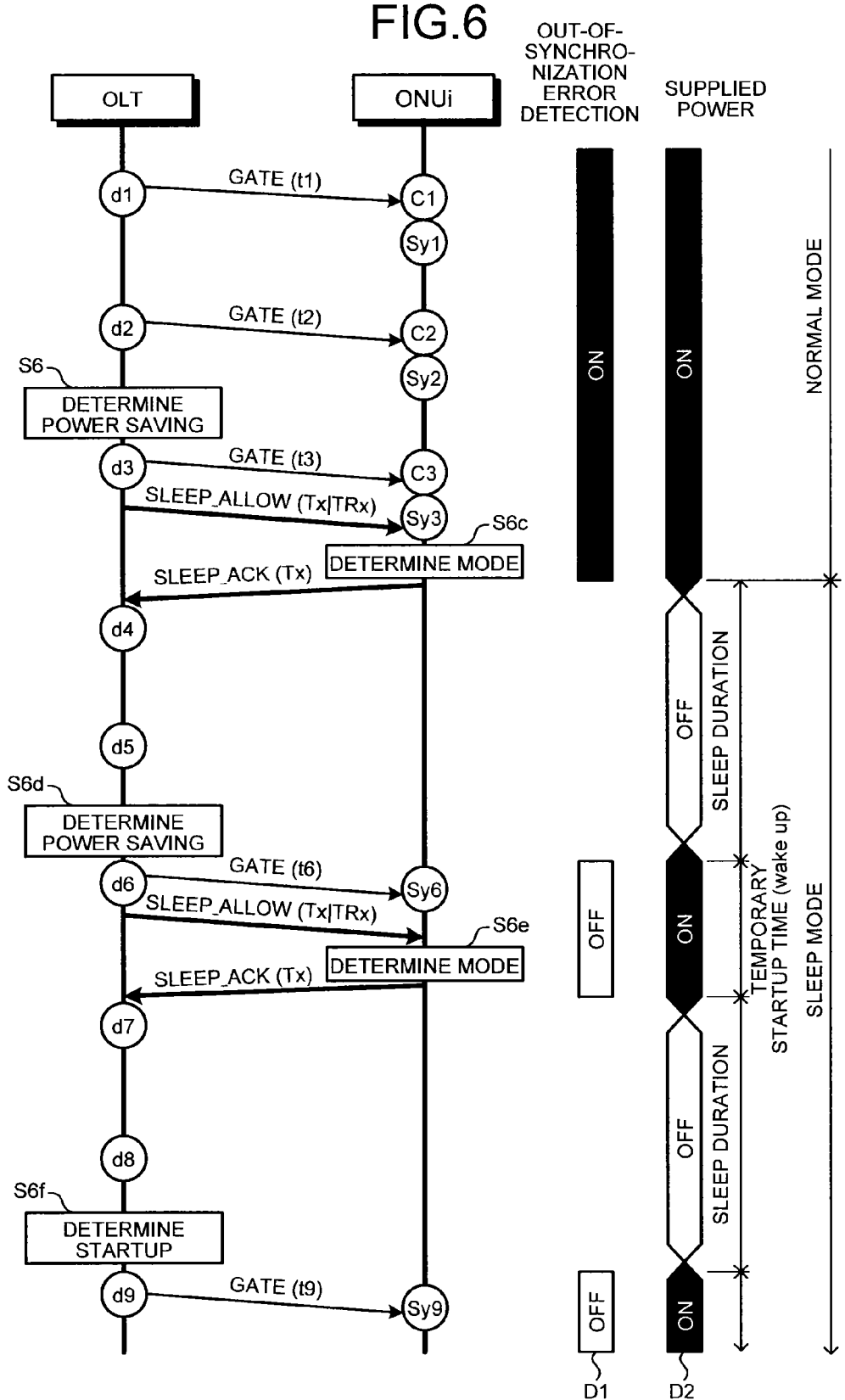

FIG.7

| |
|---|
| DESTINATION ADDRESS (Destination Address) |
| SOURCE ADDRESS (Source Address) |
| LENGTH/TYPE (Length/Type) |
| OPCODE (Opcode) |
| TIMESTAMP (Timestamp) |
| NUMBER OF GRANTS/FLAGS (Number of grants) |
| GRANT#1 START TIME (Grant#1 Start time) |
| GRANT#1 LENGTH (Grant#1 Length) |
| GRANT#2 START TIME (Grant#2 Start time) |
| GRANT#2 LENGTH (Grant#2 Length) |
| GRANT#3 START TIME (Grant#3 Start time) |
| GRANT#3 LENGTH (Grant#3 Length) |
| GRANT#4 START TIME (Grant#4 Start time) |
| GRANT#4 LENGTH (Grant#4 Length) |
| Pad/Reserved |
| FCS |

FIG.8

| |
|---|
| HEADER (header) |
| OPCODE (Opcode): "SLEEP_ALLOW" |
| SLEEP DURATION (Sleep Duration) |
| Tx Sleep PERMISSION |
| TRx Sleep PERMISSION |
| Pad/Reserved |
| FCS |

FIG.9

| |
|---|
| HEADER (header) |
| OPCODE (Opcode): "SLEEP_ACK" |
| SLEEP MODE (Sleep Mode) |
| Pad/Reserved |
| FCS |

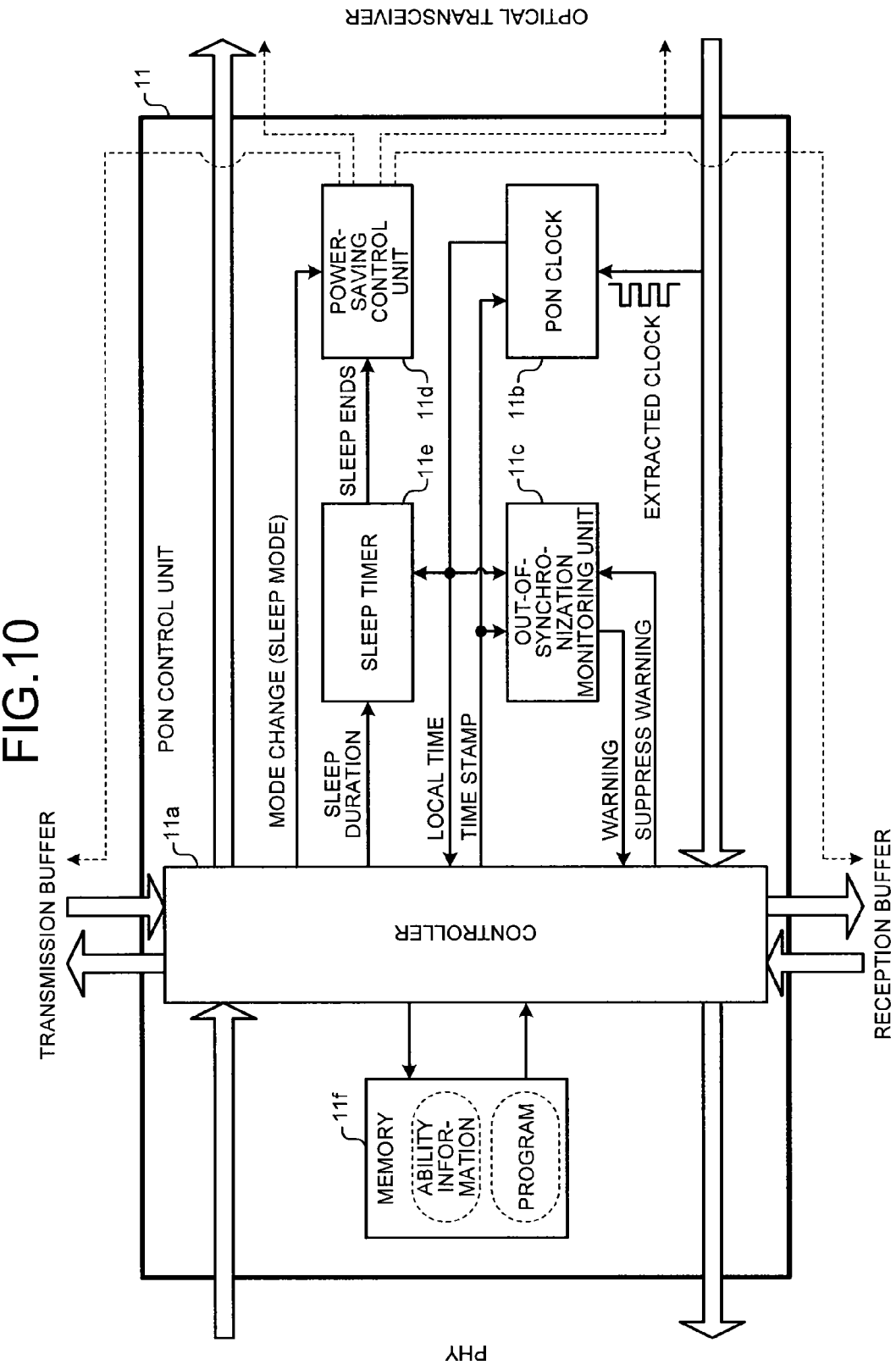

COMMUNICATION METHOD FOR OPTICAL COMMUNICATION SYSTEM, OPTICAL COMMUNICATION SYSTEM, SLAVE STATION APPARATUS, CONTROL DEVICE, AND COMPUTER PROGRAM

FIELD

The present invention relates to a communication method for an optical communication system in which a plurality of terminals are connected by a common line, the optical communication system, a slave station apparatus, a control device, and a computer program.

BACKGROUND

In a PON (Passive Optical Network) system, an OLT (Optical Line Terminal: a station-side optical line terminal apparatus) and ONUs (Optical Network Units: user-side optical line terminal apparatuses) perform communication while synchronizing with each other to prevent data in an uplink direction transmitted from the ONUs from colliding with one another. The OLT forms a plan to give transmission permission to the ONUs to prevent the data in the uplink direction from colliding with one another. In forming the plan, the OLT takes into account delays due to distances between the OLT and the ONUs. Therefore, the OLT measures round trip times between the OLT and the ONUs. However, because there is fluctuation in a transmission path such as jitter or wander in transmission by an optical fiber, it is necessary to periodically perform the measurement.

On the other hand, data communication is not always performed. The data communication is not performed at all, for example, at night. However, the measurement of round trip times is periodically performed irrespective of presence or absence of the data communication as explained above. If an ONU is always set in a communicable state for the measurement of round trip times even when the data communication is not performed, electric power is wasted. Therefore, a technology is examined for intermittently transitioning the ONU to a power saving state by requesting, from the ONU, a shift to the power saving state.

A PON system is examined that does not allocate useless transmission bandwidths to an ONU when there is no uplink data from the ONU and improves throughput (Patent Literature 1). In the PON system, when an OLT detects a state in which there is no user data for a fixed period set in advance, the OLT deletes registration of the ONU and notifies the ONU that an optical link to the ONU is temporarily stopped. Thereafter, a transmission bandwidth is not allocated to the ONU and transmission of a frame for maintaining a link is suppressed. Therefore, the ONU can reduce the number of times of transmission of the frame.

CITATION LIST

Patent Literature

Patent Literature 1: Japanese Patent Application Laid-open No. 2007-274534

SUMMARY

Technical Problem

In the PON system described in Patent Literature 1, the link to the ONU that does not transmit data for a fixed time is disconnected. Therefore, a load on the OLT can be reduced. However, when the ONU resumes transmission of uplink data, the OLT needs to perform again discovery processing for discovering an unconnected ONU. The OLT establishes a link anew and re-registers the ONU. Therefore, there is a problem in that, for example, when communication at a low bit rate continues, this communication method cannot be used.

Solution to Problem

A communication method according to an aspect of the present invention is a communication method for an optical communication system that connects a plurality of user-side optical line terminal apparatuses (hereinafter referred to as ONUs) to a station-side optical line terminal apparatus (hereinafter referred to as OLT) using a common optical fiber, the communication method including: a step of the ONU in a deregistered state staying on standby until the ONU is registered in the OLT; a discovery step of the OLT discovering the ONU in the deregistered state connected to the OLT via the optical fiber and registering the ONU as the ONU in a registered state; a communication step of the ONU that receives a synchronization signal monitoring out of synchronization by comparing the synchronization signal and a time of the own apparatus and, when the out of synchronization is detected, returning to the deregistered state and stopping transmission; and a power saving step of the ONU intermittently executing power saving control for stopping or reducing power supply to a transmitter or a receiver for a predetermined pause duration while maintaining a communication link in the communication step, wherein after the pause duration, the ONU temporarily suppresses a shift to the deregistered state due to detection of the out of synchronization.

A slave station apparatus according to another aspect of the present invention is a slave station that includes: a transmitter; a receiver; and a control device configured to control a sleep mode for stopping or reducing power consumption of at least one of the transmitter and the receiver for a predetermined sleep duration, wherein the control device detects a difference between a time stamp of an MPCPDU (Multi-Point Control Protocol Data Unit) received from a master station apparatus and a local time measured by an own apparatus, when the difference exceeds a value set in advance, detects a time stamp drift error and shifts to a deregistered state for waiting for resetting of a logical link by the master station apparatus, and, when resuming reception after the sleep duration in the sleep mode, temporarily suppresses a shift to the deregistered state due to the time stamp drift error.

An optical communication system according to still another aspect of the present invention is an optical communication system that connects a plurality of user-side optical line terminal apparatuses (hereinafter referred to as ONUs) to a station-side optical line terminal apparatus (hereinafter referred to as OLT) using a common optical fiber, wherein the OLT transmits a synchronization signal to the ONU in a registered state, and the ONU includes: a transmitter; a receiver; a power-saving control unit configured to intermittently repeat, power saving control in which the ONU stops or reduces power supply to the transmitter or the receiver for a predetermined pause duration while maintaining a communication link; a monitoring unit configured to monitor out of synchronization by comparing the received synchronization signal and a time of the own apparatus; and a control unit configured to shift from the registered state to a deregistered state when the monitoring unit detects the out of synchronization, and, on the other hand, after the pause duration of the power saving control, suppress the shift to the deregistered state due to the detection of the out of synchronization.

A control device according to still another aspect of the present invention is a control device of a user-side optical line terminal apparatus (hereinafter referred to as ONU) connected to a station-side optical line terminal apparatus (hereinafter referred to as OLT) using an optical fiber, the control device including: a power-saving control unit configured to intermittently repeat power saving control in which the ONU stops or reduces power supply to a transmitter or a receiver for a predetermined pause duration while maintaining a communication link; a monitoring unit configured to monitor out of synchronization by comparing a synchronization signal received from the OLT and a time of the ONU; and a control unit configured to shift from a registered state to a deregistered state when the monitoring unit detects the out of synchronization, and, on the other hand, after the pause duration of the power saving control, suppress the shift to the deregistered state due to the detection of the out of synchronization.

A readable storage medium containing computer program commands according to still another aspect of the present invention is a computer readable storage medium containing computer program commands that causes a computer of a slave station apparatus to execute sleep control for intermittently stopping or reducing power consumption of at least one of the transmitter and the receiver, the computer program commands causing the computer to execute: detecting a difference between a time stamp of an MPCPDU (Multi-Point Control Protocol Data Unit) received from a master station apparatus by the receiver and a local time measured by the slave station apparatus; detecting, when the difference exceeds a value set in advance, a time stamp drift error and shifting to a deregistered state for stopping transmission by the transmitter and waiting for resetting of a logical link by the master station apparatus; and a step of returning from the sleep control and supplying electric power to the transmitter and the receiver; and temporarily suppressing, in a period after a sleep duration of the sleep control, a shift to the deregistered state due to the time stamp drift error.

Advantageous Effects of Invention

The communication method for the optical communication system, the optical communication system, the slave station apparatus, the control device, and the computer program according to the present invention can improve communication efficiency in a power save operation by intermittent communication.

BRIEF DESCRIPTION OF DRAWINGS

FIG. 6 is a sequence chart for explaining a communication method in a second embodiment of the present invention.

FIG. 7 is a diagram of a format of a bandwidth allocation signal in the second embodiment of the present invention.

FIG. 8 is a diagram of a format of a sleep permission signal in the second embodiment of the present invention.

FIG. 9 is a diagram of a format of an affirmative response signal in the second embodiment of the present invention.

FIG. 10 is a configuration diagram of a control device in an embodiment of the present invention.

DESCRIPTION OF EMBODIMENTS

First Embodiment

Hardware Configuration

Figure 1:
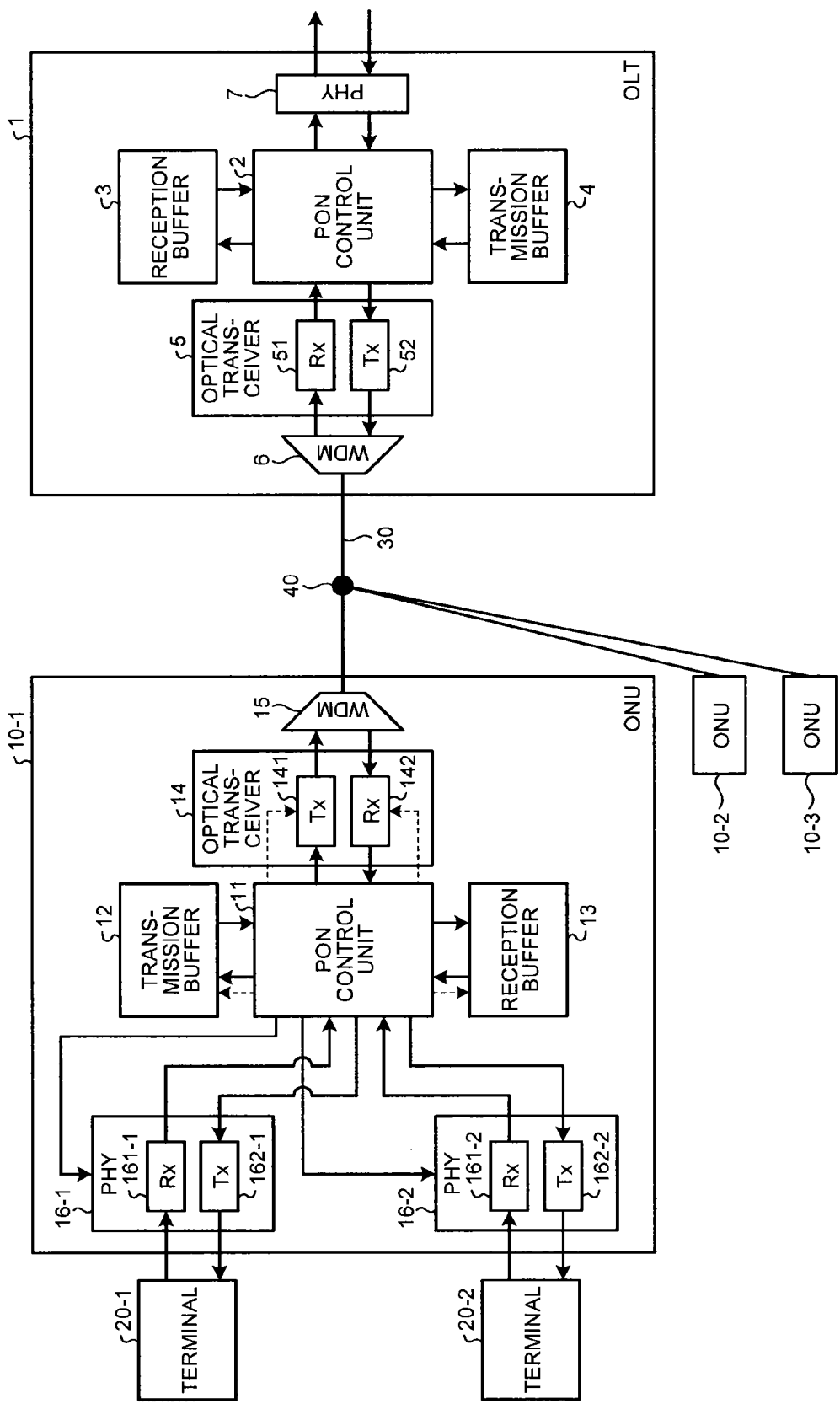
FIG. 1 is a configuration diagram of the configuration of a communication system in an embodiment of the present invention.

FIG. 1 shows an embodiment of a communication system according to the present invention and shows a PON system as an example of the communication system. As shown in FIG. 1, the communication system includes an OLT 1, which is a master station apparatus, and ONUs 10-1 to 10-3, which are slave station apparatuses. The OLT 1 and the ONUs 10-1 to 10-3 are connected by a subscriber line 30 via a splitter 40. The splitter 40 divides the subscriber line 30 connected to the OLT 1 into the number of the ONUs 10-1 to 10-3. In an example explained herein, the number of ONUs is three. However, the number of ONUs is not limited to three and can be any number.

The OLT 1 includes a PON control unit (a control device) 2 that carries out processing on the OLT side based on a PON protocol, a reception buffer 3, which is a buffer for storing uplink data received from the ONUs 10-1 to 10-3, a transmission buffer 4, which is a buffer for storing downlink data transmitted to the ONUs 10-1 to 10-3, an optical transceiver 5 that performs transmission and reception processing for an optical signal, a WDM (Wavelength Division Multiplexing) coupler (WDM) 6 that wavelength-multiplexes the uplink data and the downlink data, and a physical-layer processing unit (PHY) 7 that realizes a physical interface function of an NNI (Network Node Interface) between the PHY 7 and a network. The optical transceiver 5 includes an optical receiver (Rx: Receiver) 51 that performs reception processing and an optical transmitter (Tx: Transmitter) 52 that performs transmission processing.

The ONU 10-1 includes a PON control unit 11 that carries out processing on the ONU side based on a PON protocol, a transmission buffer (an uplink buffer) 12, which is a buffer for storing transmission data (uplink data) to the OLT 1, a reception buffer (a downlink buffer) 13, which is a buffer for storing reception data (downlink data) from the OLT 1, an optical transceiver 14, a WDM 15 that wavelength-multiplexes the uplink data and the downlink data, and physical-layer processing units (PHYs) 16-1 and 16-2 that respectively realize a physical interface function of UNIs (User Network Interfaces) between the PHYs 16-1 and 16-2 and terminals 20-1 and 20-2.

The optical transceiver 14 includes an optical transmitter (Tx: Transmitter) 141 that performs transmission processing and an optical receiver (Rx: Receiver) 142 that performs reception processing. The PHY 16-1 includes a receiving unit (Rx: Receiver) 161-1 that performs reception processing and a transmitting unit (Tx: Transmitter) 162-1 that performs transmission processing. The PHY 16-2 includes a receiving unit (Rx: Receiver) 161-2 that performs reception processing and a transmitting unit (Tx: Transmitter) 162-2 that performs transmission processing.

In FIG. 1, the number of terminals connected to the ONU 10-1 is two. However, the number of terminals is not limited to two and can be any number. The ONU 10-1 includes physical-layer processing units (PHYs) corresponding to the number of terminals. In FIG. 1, a configuration example of the ONU 10-1 is shown as a representative. However, the ONUs 10-2 and 10-3 have configurations same as the configuration of the ONU 10-1.

Like the PON system in the past, the PON control unit 2 of the OLT 1 performs bandwidth allocation for uplink data to give transmission permission to each of the ONUs 10-1 to 10-3 such that transmission time frames do not overlap and prevents collision of transmission data of the ONUs 10-1 to 10-3. Any method can be used for the bandwidth allocation. For example, Dynamic Bandwidth Allocation Algorithm described in 'Su-il Choi and Jae-doo, "HuhDynamic Bandwidth Allocation Algorithm for Multimedia Services over Ethernet (registered trademark) PONS", ETRI Journal, Volume 24, Number 6, December 2002 p 465 to p 466' can be used.

The overall operation of the OLT 1 and the ONUs 10-1 to 10-3 in this embodiment is explained. The PON control unit 2 stores downlink data (downlink communication data) received from a network through the PHY 7 in the transmission buffer 4. When data is transmitted from the OLT 1, the PON control unit 2 reads out downlink data stored in the transmission buffer 4 and outputs the downlink data to the optical transceiver 5. The Txs 52 of the optical transceiver 5 outputs transmission data to the WDM 6 as an optical signal. The WDM 6 applies wavelength multiplexing to the optical signal output from the optical transceiver 5. The optical signal is transmitted to the ONUs 10-1 to 10-3 through the subscriber line 30. When the PON control unit 2 transmits a control message for transmission bandwidth allocation or the like for transmitting an instruction for transmission permission, a control message generated by the PON control unit 2 is output to the optical transceiver 5. The control message is transmitted to the ONUs 10-1 to 10-3 in the same manner as the downlink data. In the PON system shown in FIG. 1, the WDMs 6 and 15 are used to perform the wavelength multiplexing. However, when communication is performed with a single wavelength, the WDMs 6 and 15 are not essential.

When the ONUs 10-1 to 10-3 receive a downlink signal from the OLT 1, the WDMs 15 separate the downlink signal and output the downlink signal to the optical transceivers 14. The Rxs 142 of the optical transceivers 14 convert the downlink signal into downlink data of an electric signal and output the downlink data to the PON control units 11. The PON control units 11 store the downlink data output from the Rxs 142 of the optical transceivers 14 in the reception buffers 13. The PON control units 2 read out the downlink data stored in the reception buffers 13 and output the downlink data to both or one of the PHYs 16-1 and 16-2 according to destinations of the data. The PHYs 16-1 and 16-2 that receive the downlink data apply predetermined processing to the downlink data and transmit the downlink data to the terminals 20-1 and 20-2 to which the PHYs 16-1 and 16-2 are connected.

On the other hand, when the ONUs 10-1 to 10-3 transmit uplink data, the PON control units 11 store uplink data acquired from the terminals 20-1 and 20-2 through the PHYs 16-1 and 16-2 in the transmission buffers 12. The PON control units 11 read out the uplink data stored in the transmission buffers and output the uplink data to the optical transceivers 14 based on a transmission bandwidth given from the OLT 1. The Txs 141 of the optical transceivers 14 convert the uplink data into an optical signal and transmit the optical signal to the OLT 1 through the WDMs 15 and the subscriber line 30.

The PON control unit 2 of the OLT 1 stores the uplink data received from the ONUs 10-1 to 10-3 through the subscriber line 30, the WDM 6, and the Rx 51 of the optical transceiver 5 in the reception buffer 3. The PON control unit 2 reads out the uplink data stored in the reception buffer 3 and outputs the uplink data to the network through the PHY 7.

On the other hand, when the OLT 1 transmits a control message, the PON control units 11 of the ONUs 10-1 to 10-3 receive the message through the WDMs 15 and the Rxs 142 of the optical transceivers 14. The PON control units 11 perform implementation of operation based on an instruction of the control message, generation of a response to the control message, and the like.

Power Save Operation

Figure 2:
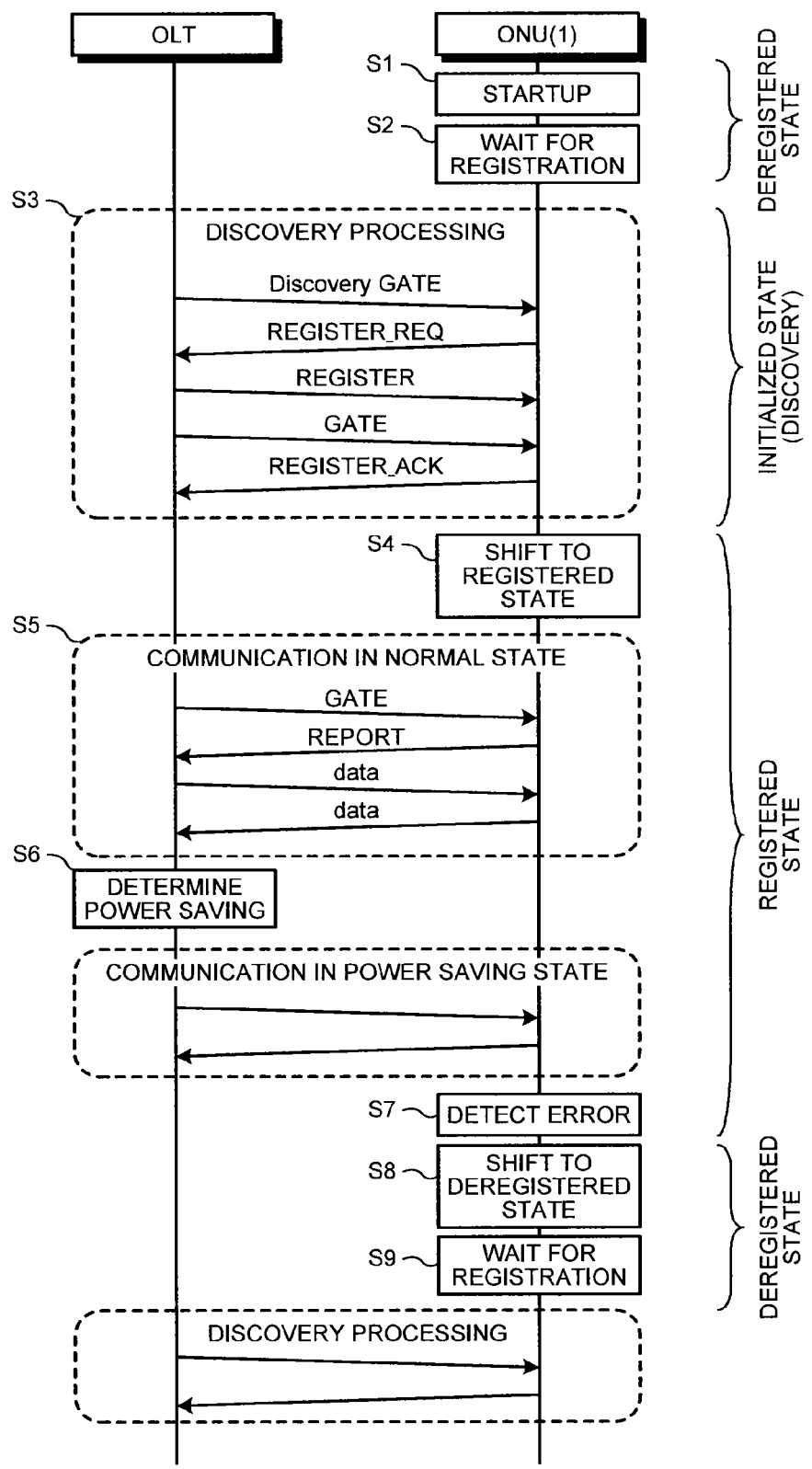
FIG. 2 is a sequence chart for explaining a communication method in a first embodiment of the present invention.

Communication start processing, a power save operation, and error detection processing by the started-up ONUs 10-1 to 10-3 (hereinafter referred to as ONUs 10 when one ONU is not specified) are explained with reference to FIG. 2.

(S1 to S2) Deregistered State

When the ONU 10 is connected to the line 30 anew or when main body power is supplied and the ONU 10 is started up anew (step S1), the ONU 10 performs reception by the transceiver 14 and stays on standby without performing transmission until transmission permission is obtained from the OLT 1 (step S2). At this point, the ONU 10 is not registered in the OLT 1 as a communication correspondent. The ONU 10 does not own a communication parameter necessary for communication such as an LLID (Logical Link Identification). Because the ONU 10 is in a deregistered state, a logical link is not set in the ONU 10. A transmission bandwidth for time-division multiple access in uplink communication is not allocated to the ONU 10.

(S3 to S4) Initialized State (Discovery)

To start normal data communication, the ONU 10 in the deregistered state has to be discovered by the OLT 1 and registered in the OLT 1 through discovery processing. To discover the ONU 10 in the deregistered state, the OLT 1 regularly or irregularly executes the discovery processing. First, the OLT 1 multicast-transmits a discovery gate (Discovery GATE). In the discovery gate, a common transmission bandwidth (called discovery window) of an uplink is described. The ONU 10 transmits a registration request (REGISTER_REQ), in which identification information (a transmission source address) of the own apparatus is recorded, using the common transmission bandwidth. When the OLT 1 receives the registration request, the OLT 1 allocates a logical link to the ONU 10 at a transmission source, inserts a communication parameter such as an LLID into a registration signal (REGISTER), and transmits the registration signal to the ONU 10. Further, the OLT 1 transmits a bandwidth allocation signal (GATE) to the ONU 10 to allocate an individual transmission bandwidth to the ONU 10. The ONU 10 that receives the registration signal stores the communication parameter, transmits an affirmative response signal (REGISTER_ACK) to the OLT 1 using the allocated bandwidth and the LLID, and shifts to a registered state (step S4).

(S5 to S6) Registered State

When the OLT 1 receives the affirmative response signal (REGISTER_ACK), the OLT 1 adds the ONU 10 in a list of the ONUs 10 in the registered state. The OLT 1 allocates transmission bandwidths to the ONUs 10-1 to 10-3 in the registered state at each short period called bandwidth update period and notifies the ONUs 10 of the transmission bandwidths using a bandwidth allocation signal (GATE or Normal GATE). The allocation of transmission bandwidths is determined based on state of uplink traffic or a request for uplink traffic obtained from transmission bandwidth requests (REPORT) from the ONUs 10. The OLT 1 transmits a downlink signal (data) designating destination information and an LLID, receives an uplink signal in the bandwidths allocated to the ONUs 10 earlier, and performs transmission and reception of data. Such transmission and reception of GATE, REPORT, and data are repeated at the bandwidth update period.

When an amount of communication with the ONU 10 decreases or when it is desired to reduce power consumption in a specific time frame such as late at night, a power failure, a tight power demand, or the like (in the present invention, reasons for a shift to power saving are not limited to these reasons), the OLT 1 determines a shift to a power saving state for all the ONUs 10 or the individual ONUs 10 (step S6) and starts communication in the power saving state. The communication in the power saving state is explained below with reference to FIG. 3. In the power saving state, the ONU 10 reduces electric power consumed by the transmitter or the receiver by temporarily limiting transmission or reception. On the other hand, the ONU 10 can maintain a communication link with the OLT 1 and can continue transmission and reception at a low transmission rate by continuing the intermittent communication without shifting to the deregistered state.

In the registered state, both of the OLT 1 and the ONU 10 always monitor a communication failure during transmission and reception (step S7). When an error is detected, the ONU 10 shifts from the registered state to the deregistered state to perform resetting of a logical link and stops the transmission performed using the set communication parameter (step S8). The ONU 10 that shifts to the deregistered state returns to the waiting state for registration by the OLT 1 as explained at step S2 above (step S9).

As the error, there are a LOS (Loss of Signal) by a watchdog timer and an out-of-synchronization error. When time-division multiple connection is performed, unless transmission timing of signals transmitted by the ONUs 10 is accurately observed, uplink signals collide with one another and the OLT 1 cannot normally receive the signals. Therefore, the OLT 1 shares a time with the ONUs 10 and frequently transmits a synchronization signal to thereby synchronize a local time held by the ONU 10 with a time of the own apparatus. The out-of-synchronization error is an error output when a difference between time information received by the ONU 10 and a local time measured by the ONU 10 is equal to or larger than a predetermined threshold. The ONU 10 detects the out-of-synchronization error and returns to the deregistered state to thereby prevent a problem such as collision of uplink signals and secure safety of the entire communication system.

The overview of the communication protocol is explained above. Details of communication in the power saving state and out-of-synchronization detection are explained below with reference to FIG. 3.

Communication in the Power Saving State (Sleep Mode)

Figure 3:
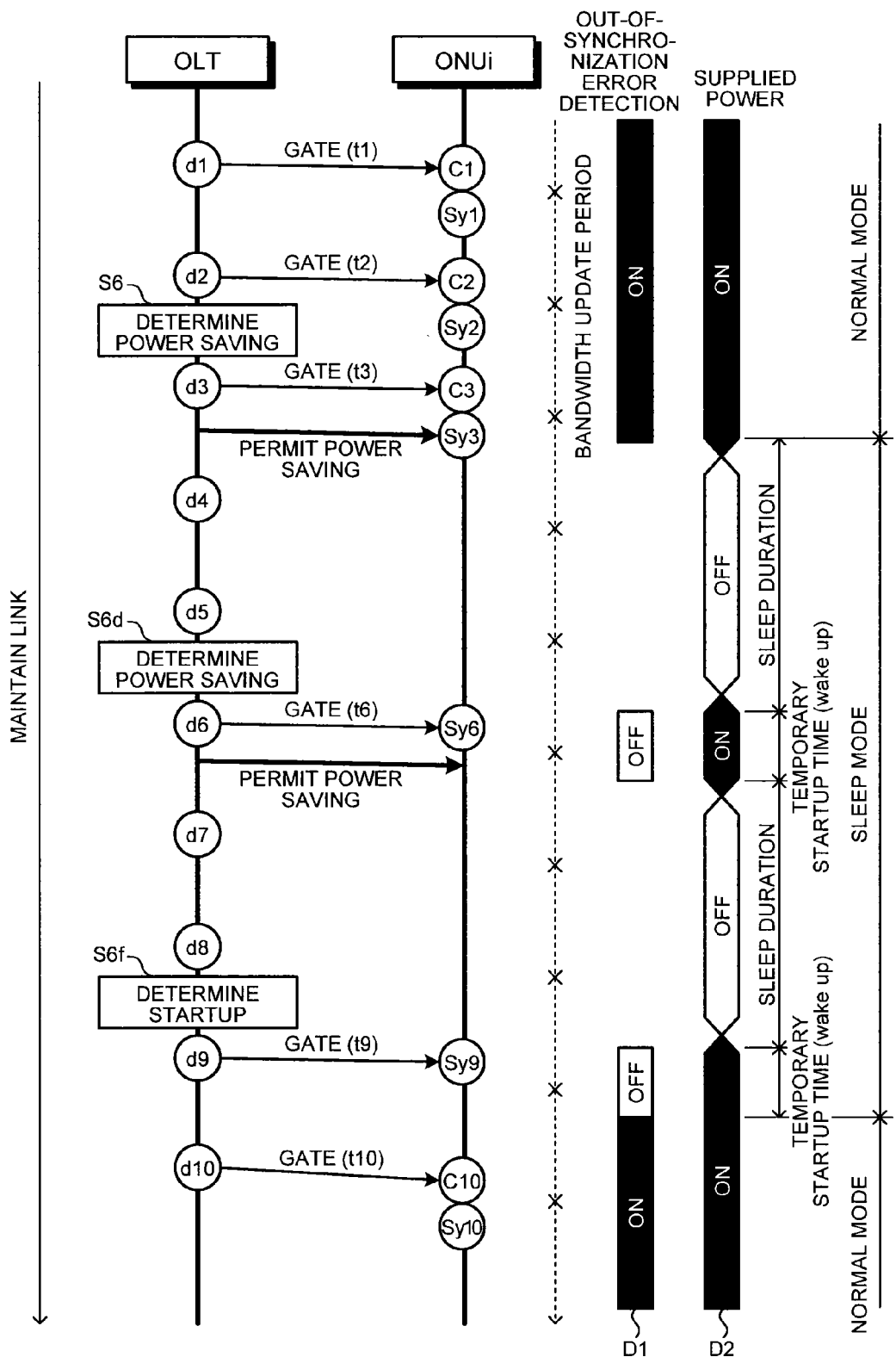
FIG. 3 is a sequence chart for explaining the communication method in the first embodiment of the present invention.

FIG. 3 shows a sequence of downlink communication between the ONU 10 in the registered state and the OLT 1 (in FIG. 3, a sequence of uplink communication is omitted). In a normal communication state, the OLT 1 inserts an allocated transmission bandwidth and time information t1 (equivalent to synchronization information) for synchronization into a bandwidth allocation signal (GATE) and transmits the GATE to the ONU 10 (d1). When the ONU 10 receives the GATE, the ONU 10 extracts the time information t1 from the received signal and detects a difference between the time information t1 and a time measured by the own apparatus (C1). When the difference is equal to or larger than a threshold set in advance, the ONU 10 detects the out-of-synchronization error and shifts to the deregistered state. When the difference is smaller than the threshold set in advance, the ONU 10 synchronizes the time of the own apparatus with the time information t1 (Sy1). According to the synchronization, the ONU 10 can perform transmission of an uplink signal at a more accurate time. The OLT 1 and the ONU 10 repeat the same processing at each bandwidth update period (d2, C2, and Sy2) and perform transmission and reception while always synchronizing each other. In FIG. 3, Cn represents out-of-synchronization monitoring and Syn represents synchronization processing (n is a positive integer).

The OLT 1 determines, at each bandwidth update period or at predetermined timing, whether to permit the ONU 10 to shift to the power saving state (step S6). When permitting the shift to the power saving state, the OLT 1 transmits a power saving permission signal to the ONU 10 (d3). At this point, the GATE is also transmitted. The ONU 10 that receives the power saving permission signal shifts to the power saving state unconditionally or based on own determination concerning the shift to the power saving state. For example, the ONU 10 can determine, based on a state of traffic, service content of a link, and an operation state of the terminals 20-1 and 20-2, whether a reduction in a transmission rate and occurrence of a delay can be allowed.

Figure 4:
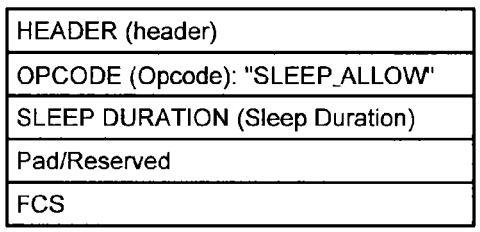
FIG. 4 is a diagram of a signal format in the first embodiment of the present invention.

An example of a format of the power saving permission signal is shown in FIG. 4. The signal has information such as a header in which control information such as destination information is described, a command code indicating the power saving permission signal, and sleep duration allowed to the ONU 10. Pad/Reserved is dummy data described in an excess region of a frame to adjust the length of the signal. FCS (Frame Check Sequence) is data for detecting an error of the signal. As the power saving permission signal, for example, an extended OAM (Operation Administration and Maintenance) message of IEEE 802.3av is used. The power saving permission signal is stored in a MAC (Media Access Control) frame and transmitted. The power saving permission signal can be created using an extended MPCP (Multi-Point Control Protocol) message instead of the extended OAM. A signal form and a type of the power saving permission signal are not limited to specific ones.

After shifting to the power saving state, the ONU 10 performs control for eliminating or reducing power consumption of any one of transmission processing and reception processing or both. As the control of the power consumption, there is control as illustrated bellow.

[1] Illustration of Control of the Power Consumption (Power Saving Control)

(a) Cut off or reduce supplied power to any one of the transmitter 141 and the receiver 142 or both
(b) Stop power supply to and reduce an operation frequency of any one of the transmission buffer 12 and the reception buffer 13 or both
(c) Reduce an operation frequency of the PON control unit 11
(d) Stop functions of a part of electronic components included in the ONU 10 such as a light-emitting element Each of these kinds of control is an example. In the present invention, any control, means, and the like can be used as long as the control, the means, and the like can reduce power consumption. Specific means is not limited to the above illustrations.

Reference sign D2 in FIG. 3 indicates ON and OFF of the supplied power to any one of the transmitter 141 and the receiver 142 or both. ON represents time when normal control is performed. OFF represents time when the power saving control is performed. When the ONU 10 shifts to the power saving state, the ONU 10 performs the power saving control for predetermined pause duration (sleep duration) and reduces power consumption. The sleep duration is measured by a timer or the like. The ONU 10 starts, before the sleep duration expires, resumption of the power supply or the like and recovers a function such that transmission and reception in the normal state can be performed after the sleep duration elapses. During the sleep duration, the OLT 1 does not have to transmit the GATE to the ONU 10 (d4 and d5). To continue communication in a downlink direction, the OLT 1 can transmit the data and the GATE to the ONU 10 in the sleep duration as well.

When the sleep duration ends, the ONU 10 changes again to a state in which the ONU 10 can perform transmission and reception. The OLT 1 determines whether permission of the power saving state is continued (step S6d). When the permission is continued, the OLT 1 transmits the power saving permission signal to the ONU 10 again. When the ONU 10 receives the power saving permission signal, the ONU 10 performs the power saving control again and changes to the power saving state in the sleep duration. Although not shown in the figure, to inform the OLT 1 of maintenance of a link, the ONU 10 can transmit the REPORT to the OLT 1.

By repeating such processing many times, for example, in one second, the OLT 1 and the ONU 10 can reduce the consumed power while maintaining a communication link. There is a temporary startup time between the sleep duration and the sleep duration. In the temporary startup time during the sleep mode, the OLT 1 and the ONU 10 can transmit uplink and downlink signals and continues communication at low bit rate.

When the OLT 1 determines that the OLT 1 does not give the power saving permission to change the ONU 10 to a complete startup state (step S6f), the OLT 1 transmits the GATE as usual without transmitting the power saving permission signal to the ONU 10 for which the sleep duration ends. When the ONU 10 does not receive the power saving permission signal in the temporary startup time, the ONU 10 performs power control at normal time without shifting to the power saving state. Therefore, both of the transmission function and the reception function are maintained in an active state.

Out-of-Synchronization Detection During the Use of the Power Saving Control

Out-of-synchronization detection control having a high effect of maintaining a communication link in the power saving control is explained. With the control, it is possible to reduce a probability that a communication link is disconnected during the use of the power saving control and re-registration of the ONU 10 is necessary. The re-registration wastes a long time such as time that depends on a period of registration processing (discovery processing), a discovery window set long to prevent signal collision in a shared bandwidth, and a plurality of times of messages necessary until registration. The communication system can suppress a transmission delay and a decrease in a transmission rate by reducing a probability of occurrence of the re-registration.

The ONU 10 measures a local time using a clock of the own apparatus. Transmission processing is performed based on the local time. The local time is frequently corrected according to time information of the GATE or the like. The ONU 10 can perform operation synchronized with the OLT 1 and the other ONUs 10. In the sleep duration, the local time sometimes deviates from the time of the OLT 1 unless the synchronization is performed. For example, after the synchronization is performed at timing of Sy3 in FIG. 3, if synchronization processing is not performed using time information of the GATE during the sleep duration, a difference between the local time and time information t6 of the GATE is large at the temporary startup time after the end of the sleep duration.

Further, the local time measured by the ONU 10 is tuned to, at the normal time, for example, a phase of a clock signal included in a signal transmitted by the OLT 1. Therefore, it is likely that, when the ONU 10 halts reception, an error of the measured local time autonomously increases. Therefore, a probability of a shift to the deregistered state increases if out-of-synchronization detection is performed at this timing as in a normal mode.

Therefore, the ONU 10 performs control for suppressing a shift to the deregistered state due to an out-of-synchronization error after the end of the sleep duration. Reference sign D1 in FIG. 3 indicates presence or absence and timing of out-of-synchronization error detection (more essentially, a shift to the deregistered state). The ONU 10 performs detection of an out-of-synchronization error (or shift processing to the deregistered state by the detection) at the normal time. On the other hand, at timing after the end of the sleep duration, the ONU 10 performs control for temporarily suppressing the detection of an out-of-synchronization error (or shift processing to the deregistered state based on the detection) and not detecting an error or, even if an error is detected, not shifting to the deregistered state. The suppression of an out-of-synchronization error can be realized by not only processing for not performing the detection but also increasing a threshold of the out-of-synchronization error detection. In other words, as error detection processing, the ONU 10 can also set a threshold used after the end of the sleep duration to a value larger than a threshold at the normal time and use processing for expanding a tolerance of out of synchronization.

In contrast to the suppression processing for the out-of-synchronization detection, the ONU 10 performs synchronization processing for the local time at the temporary startup time after the end of the sleep duration (Sy6 and Sy9). According to the synchronization processing, transmission of the REPORT and transmission of uplink data at the temporary startup time are accurately performed. At timing of Sy9, after the synchronization processing is performed, the ONU 10 releases the suppression of the out-of-synchronization detection. Therefore, because the out-of-synchronization detection is performed as usual concerning processing after Sy9, the synchronization of the entire system is satisfactorily maintained.

Details of Processing by the Control Device (the Slave Station)

Figure 5:
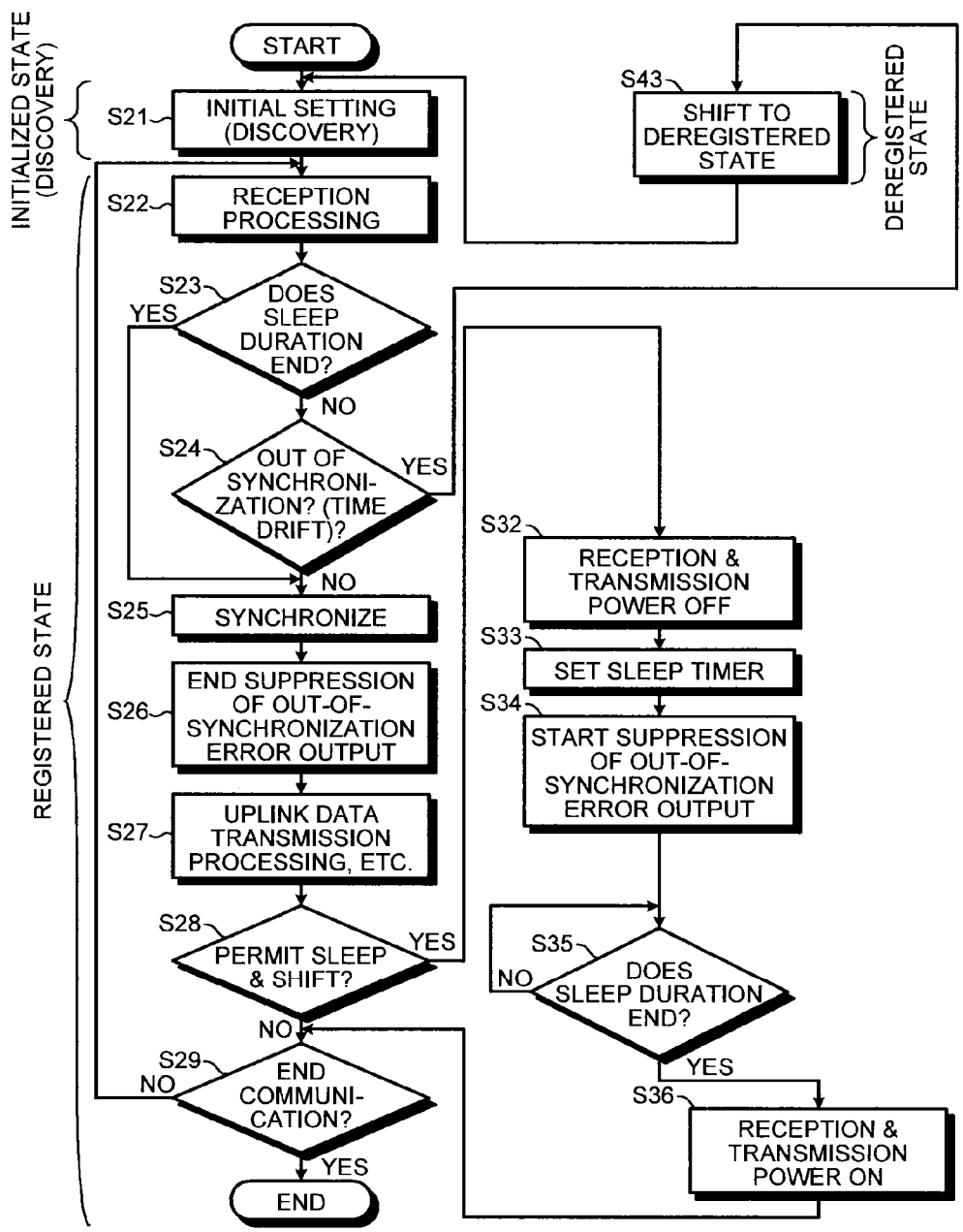
FIG. 5 is a flowchart for explaining communication control for a slave station apparatus in the first embodiment of the present invention.

Processing by the PON control unit 11 of the ONU 10 is explained with reference to FIG. 5. FIG. 5 is a flowchart for executing the communication sequence explained above. The control of the flowchart can be incorporated in the control device 11 as a computer program executable by a computer.

First, the PON control unit 11 in the deregistered state cannot start communication of a higher order service unless the PON control unit 11 is registered in the OLT 1. Therefore, the PON control unit 11 performs the discovery processing as explained above and registers information concerning the own apparatus in the OLT 1 (step S21). Subsequently, the PON control unit 11 performs reception processing for data received by the optical transceiver 14 (step S22). It is unknown when data addressed to the own apparatus arrives. Therefore, the reception processing is performed such that reception omission of the data does not occur except in the sleep duration. In the reception processing, control signals such as the GATE and the power saving permission signal, general data, and the like are received.

Subsequently, the PON control unit 11 discriminates whether processing currently being executed is processing after the end of the sleep duration (step S23). The PON control unit 11 can determine the end of the sleep duration using a timer. However, in this processing, the PON control unit 11 determines the end of the sleep duration according to output suppression/release information concerning out-of-synchronization errors recorded at step S26 and step S34. When the PON control unit 11 determines that the processing currently being executed is not processing after the end of the sleep duration, the PON control unit 11 checks, based on time information included in the received signal, whether an out-of-synchronization error occurs (step S24). Time information called time stamp is included in the GATE. The PON control unit 11 calculates a difference between the time stamp and a local time and, when the difference exceeds a threshold (guardThresholdONU), outputs an error (time stamp drift error). When an error is detected, the PON control unit 11 shifts to processing at step S43 and shifts to the deregistered state.

When an error is not detected, the PON control unit 11 sets the local time to time described in the time information and synchronizes the local time with the time. The order of the synchronization and the error detection does not have to be this order. If the error detection can be performed after the synchronization, the PON control unit 11 can perform the synchronization first. A reference of comparison with the time information is a local time before correction.

Subsequently, the PON control unit 11 performs end processing (or release) for the output suppression for an out-of-synchronization error (step S26). The processing is processing performed to reset the output suppression information stored at step S34. After the synchronization processing ends, it is unnecessary to allow large out of synchronization after the end of the sleep duration. Therefore, the PON control unit 11 resets the output suppression information and changes the control such that an out-of-synchronization error is detected as usual.

After the synchronization processing is completed, the PON control unit 11 transmits an uplink signal using a transmission bandwidth allocated from the OLT 1 (step S27). When a plurality of transmission bandwidths are allocated, the PON control unit 11 executes transmission processing for the respective bandwidths.

Subsequently, the PON control unit 11 checks whether the power saving permission signal (sleep permission) is received (step S28). For example, in the case of the signal format shown in FIG. 4, whether a received signal is the power saving permission signal is discriminated according to whether "SLEEP_ALLOW" is described in a command code. Usually, character data is not directly written as "SLEEP_ALLOW". "SLEEP_ALLOW" is a value encoded to a short code. Even when power saving permission is received, the PON control unit 11 can choose not to shift to the power saving state according to own determination. Therefore, when the power saving permission signal is received and the PON control unit 11 determines to shift to the power saving state, the PON control unit 11 executes the power saving control started at step S32. When the power saving permission is not received or when the PON control unit 11 determines for itself not to shift to the power saving under conditions given in advance, the PON control unit 11 determines whether a communication end event such as shutdown occurs. When the PON control unit 11 does not end the communication, the PON control unit 11 returns to step S22 and executes transmission and reception processing at the next period.

The power saving control is explained.

When the PON control unit 11 determines at step S28 to shift to the power saving state, the PON control unit 11 stops the transmission and the reception and performs the power saving control for, for example, stopping the power supply to the optical transceiver 14. The transmission function and the reception function are stopped. However, the PON control unit 11 can also perform the power saving control for one of the functions, for example, stop only the transmission.

The PON control unit 11 initializes a sleep timer and starts measurement of the sleep duration (step S33). Subsequently, the PON control unit 11 performs output suppression processing for an out-of-synchronization error (step S34). The output suppression processing is executed by, for example, rewriting output suppression information stored in a memory or a register to a code indicating "suppression". Subsequently, the PON control unit 11 monitors the sleep timer and stays on standby until the sleep duration expires. At this point, the PON control unit 11 can continue the communication with the terminals 20-1 and 20-2. When data is received, the PON control unit 11 accumulates the data in the reception buffer 13 until the next transmission bandwidth is allocated. When the reception buffer 13 is in a stop/low power state, the PON control unit 11 starts up the reception buffer 13 to accumulate the data in the reception buffer 13.

At timing immediately before the sleep duration expires, the PON control unit 11 releases the power saving control at step S32 and performs control for supplying electric power to the transceiver 14 and the like as usual (step S36). When the processing ends, the PON control unit 11 shifts to step S29 and performs transmission and reception at the next period in the normal mode.

Step S43 is processing in which the ONU 10 shifts from the registered state to the deregistered state. When the PON control unit 11 detects an out-of-synchronization error in a state in which the output suppression for an out-of-synchronization error is not performed, the PON control unit 11 invalidates setting information concerning a link, stops the transmission, and shifts to the deregistered state. The ONU 10 in the deregistered state stays in a standby state until the ONU 10 is re-registered in the OLT 1 according to the discovery processing as explained above. Although not shown in the figure, the ONU 10 sometimes transitions to the deregistered state for itself because of other errors or under other given conditions.

As explained above, according to this embodiment, disconnection of a link due to out of synchronization during power saving and a shift of the slave station to the deregistered state can be reduced. Therefore, it is possible to improve efficiency of communication in which a power saving function is used. The communication system according to this embodiment has an advantage that it is possible to suppress a delay in data transmission due to re-registration.

A tolerance of out of synchronization allowed by wide bandwidth communication is an extremely small value. In Ethernet (registered trademark), a tolerance of a frequency deviation is +/−100 [ppm]. The tolerance changes according to various conditions, however, the reception processing and the synchronization processing are halted even for a short time such as 10 [ms], it is likely that a synchronization error occurs after return from the power saving state and re-registration of the ONU 10 is necessary. In this embodiment, even in such a communication system, it is possible to realize more stable communication.

Second Embodiment

A communication system in which a slave station can select a power saving mode is explained. FIG. 6 shows a communication sequence in a second embodiment. In FIG. 6, reference signs same as those in FIG. 3 denote the same or equivalent sections.

In FIG. 6, a SLEEP_ALLOW message is used as a power saving permission signal (see d3). A parameter of the power saving mode permitted by the OLT 1 is set in SLEEP_ALLOW. The power saving mode is, for example, as explained below.

[2] Power Saving Mode
(Tx): Tx Sleep
Electric power used for transmission is reduced by limiting a function related to the transmission such as a stop of the transmission.
(TRx): TRx Sleep
Electric power used for transmission and reception is reduced by limiting transmission and reception functions such as a stop of transmission and reception.
(Rx): Rx Sleep
Electric power used for reception is reduced by limiting a reception function such as a stop of reception.

The OLT 1 determines permitted modes based on, for example, a situation of any one of uplink traffic and downlink traffic or both (steps S6 and S6*d*). The power saving modes to be permitted can be determined according to any determination criterion as long as the determination criterion is determined based on conditions given in advance. Therefore, in this embodiment, the determination criterion is not limited to a specific criterion.

Selection criteria for the permitted modes are illustrated below.

[3] Examples of the Selection Criterion for the Permitted Modes
(a) An amount of uplink traffic/downlink traffic of the ONU 10: shift to power saving when the amount is smaller than a threshold
A data accumulation amount of transmission buffer/reception buffer
Statistic information in the past
(b) Contents of service provided to the ONU 10 and a contract with a user
Business/personal (TRx and Rx are prohibited for business and all modes are permitted for personal)
Low delay service/delay permission service (Only Tx is permitted for the low delay service)
Size of a guaranteed bandwidth
(c) Corresponding information of a power saving (power save) function acquired from the ONU 10 according to discovery processing
(d) Time frame (set the permitted modes for each time frame)

In the SLEEP_ALLOW message, it is possible to designate single or a plurality of power saving modes. In an example shown in FIG. 6, the OLT 1 designates two power saving modes of Tx Sleep and TRx Sleep as the permitted modes, inserts permitted mode information in the SLEEP_ALLOW message, and transmits the SLEEP_ALLOW message to the ONU 10. The ONU 10 that receives the SLEEP_ALLOW message selects a power saving mode to be used out of the permitted modes and performs power control (steps S6*c* and S6*e*). The ONU 10 transmits an affirmative response signal (SLEEP_ACK) in which the selected power saving mode is designated to the OLT 1.

The ONU 10 selects the power saving mode to be used out of the permitted modes based on conditions and the like explained below. The power saving mode selected by the ONU 10 can be determined according to any determination criterion as long as the determination criterion is determined based on conditions given in advance. Therefore, in this embodiment, the determination criterion is not limited to a specific criterion.

[4] Selection Condition Examples for the Power Saving Mode
(a) A type, a startup state, and an operation state of the terminals 20-1 and 20-2
Select Tx for a terminal requested to have a low delay.
When a terminal is started up, select Tx and when a terminal is stopped, select TRx.
Select TRx for a terminal not accessed for a fixed time.
Select Tx when there is a certain degree of accesses.
(b) A situation of uplink traffic and downlink traffic,
for example, select Tx when the uplink traffic is smaller than a threshold.
(c) An occupied state of a transmission or reception buffer,
when an amount of data occupying the buffer is smaller than a threshold, transition a function in the corresponding direction to power saving.
(d) Information concerning the power saving mode to which the own apparatus correspond,
(e) An operation environment change of the ONU 10 such as a power failure (an ONU mounted with a battery can continue operation using electric power of the battery when a power failure occurs)

When the OLT 1 receives a SLEEP_ACK message, the OLT 1 learns that the ONU 10 has shifted to the power saving mode. Therefore, the OLT 1 can allocate uplink and downlink bandwidths to the ONU 10 according to the power saving mode. For example, in the case of TxSleep, because the ONU 10 can perform reception, the OLT 1 can continue transmission of downlink data as usual. Further, the OLT 1 can notify the ONU 10 of a transmission bandwidth in advance using allocated GATE such that the ONU 10 can transmit uplink data generated during a sleep duration.

In the case of TRx Sleep, the OLT 1 can reduce wastes of bandwidths by allocating a large number of transmission bandwidths to the other ONUs 10 without performing downlink data transmission. It can be assumed that the ONU 10 does not receive the GATE either. Therefore, the OLT 1 can also choose not to allocate a transmission bandwidth to the ONU 10 in the sleep duration (the OLT 1 can also choose to allocate a transmission bandwidth in case when the ONU 10 starts reception halfway in the sleep duration).

Even when the communication protocol explained above is used, out-of-synchronization detection, i.e., control of a time stamp drift error effectively functions. The ONU 10 suppresses a shift to a deregistered state due to a time stamp drift error in a temporary startup time during a sleep mode and prevents suspension of communication. A selection result of the power saving mode is transmitted at correct transmission timing according to a local time subjected to synchronization processing. Therefore, communication during the power saving is normally continue.

Message Format

FIG. 7 is an example of a message format of the GATE. A GATE frame of MPCPDU (Multi-Point Control Protocol Data Unit) is shown. A GATE message has, as an opcode, a code indicating the GATE and delivers 32-bit transmission time data to the ONU 10 as a time stamp. The OLT 1 can designate a plurality of transmission bandwidths (grants) in the GATE message and permit the transmission bandwidths to the ONU 10.

FIG. 8 shows an example of a message format of SLEEP_ALLOW. Description of the sleep duration is an option. The OLT 1 and the ONU 10 can negotiate the sleep duration at the time of discovery without describing the sleep duration in SLEEP_ALLOW messages and use the sleep duration determined in advance by the negotiation.

The power saving modes to be permitted are designated in a Tx Sleep permission space and a TRx Sleep permission space. Although not shown in the figure, a Rx Sleep permission space can also be provided in a message. One space can be provided without separately providing a space for each mode. In this case, a code enabling identification of combinations of a plurality of permitted modes is described in the one space.

FIG. 9 shows an example of a message format of SLEEP_ACK. The ONU 10 describes a selected sleep mode in a sleep mode space and transmits a message to the OLT 1. When the ONU 10 does not shift to the power saving state or when the ONU 10 releases the power saving state, the ONU 10 describes a code indicating "awake" in the sleep mode space and notifies the OLT 1 to that effect.

It is needless to say that a name other than GATE, SLEEP_ALLOW, and SLEEP_ACK can be used as a signal name. As a sleep permission signal and an affirmative response signal, an extended OAM message of IEEE 802.3av can be used or an extended MPCP message or other control signals can also be used.

Control Device

FIG. 10 is a diagram of an example of the PON control unit 11 of the ONU. The PON control unit 11 is, for example, a control device that can control communication by IEEE 802.3, IEEE 802.3av, or a communication protocol succeeding IEEE 802.3 and IEEE 802.3av. A communication protocol treated by the PON control unit 11 is not limited to IEEE 802.3av and the like. A controller 11*a* reads commands of a computer program stored in a memory 11*f* and performs input and output of signals and controls components according to the commands. The memory 11*f* stores the computer program, communication parameters, ability information (e.g., time required for startup of a transmitter and an executable sleep mode) of the own apparatus, and the like.

A PON clock 11*b* measures a local time (e.g., in tune with a phase change of a clock signal that periodically changes) while following a clock included in a received signal and supplies time information (the local time) for discriminating transmission and reception timing to the controller 11*a*. The local time of the PON clock 11*b* needs to be strictly synchronized with the OLT 1. Therefore, the controller 11*a* corrects the local time of the PON clock 11*b* using a time stamp regularly or irregularly received from the OLT 1. This processing is synchronization processing. An out-of-synchronization monitoring unit 11*c* compares the local time and the time stamp of the received signal, monitors presence or absence of an out-of-synchronization error (a time stamp drift error), and notifies the controller 11*a* of a warning.

A sleep timer 11*e* is a timer for measuring the sleep duration. The sleep duration is designated in advance by information included in the power saving permission signal received by the ONU 10, a value negotiated with the OLT 1 in advance, a default value set in advance, or the like. When the sleep timer 11*e* receives the power saving permission signal, the sleep timer 11*e* measures the elapse of the sleep duration and outputs a signal for notifying expiration of the sleep duration. A power-saving control unit 11*d* controls power consumption of any one of the Tx 141 and the Rx 142 of the transceiver 14, the transmission buffer 12, and the reception buffer 13 or all. The power-saving control unit 11*d* performs control of power saving according to an instruction of the controller 11*a* and a measured time of the sleep timer 11*e*. Functions of the out-of-synchronization monitoring unit 11*c*, the power-saving control unit 11*d*, and the sleep timer 11*e* can also be incorporated in the controller 11*a*.

The out-of-synchronization monitoring unit 11*c* outputs a warning to the controller 11*c* when the out-of-synchronization monitoring unit 11*c* detects an out-of-synchronization error. The warning is used for transition to the deregistered state. The controller 11*c* controls the out-of-synchronization monitoring unit 11*c* to suppress the output of the warning in association with a power saving operation. The same purpose can also be achieved by preventing the ONU 10 from shifting to the deregistered state under a predetermined condition even if the controller 11*a* does not output a warning suppression signal to the out-of-synchronization monitoring unit 11*c* and receives the warning.

Operation of the Control Device

Figure 11:
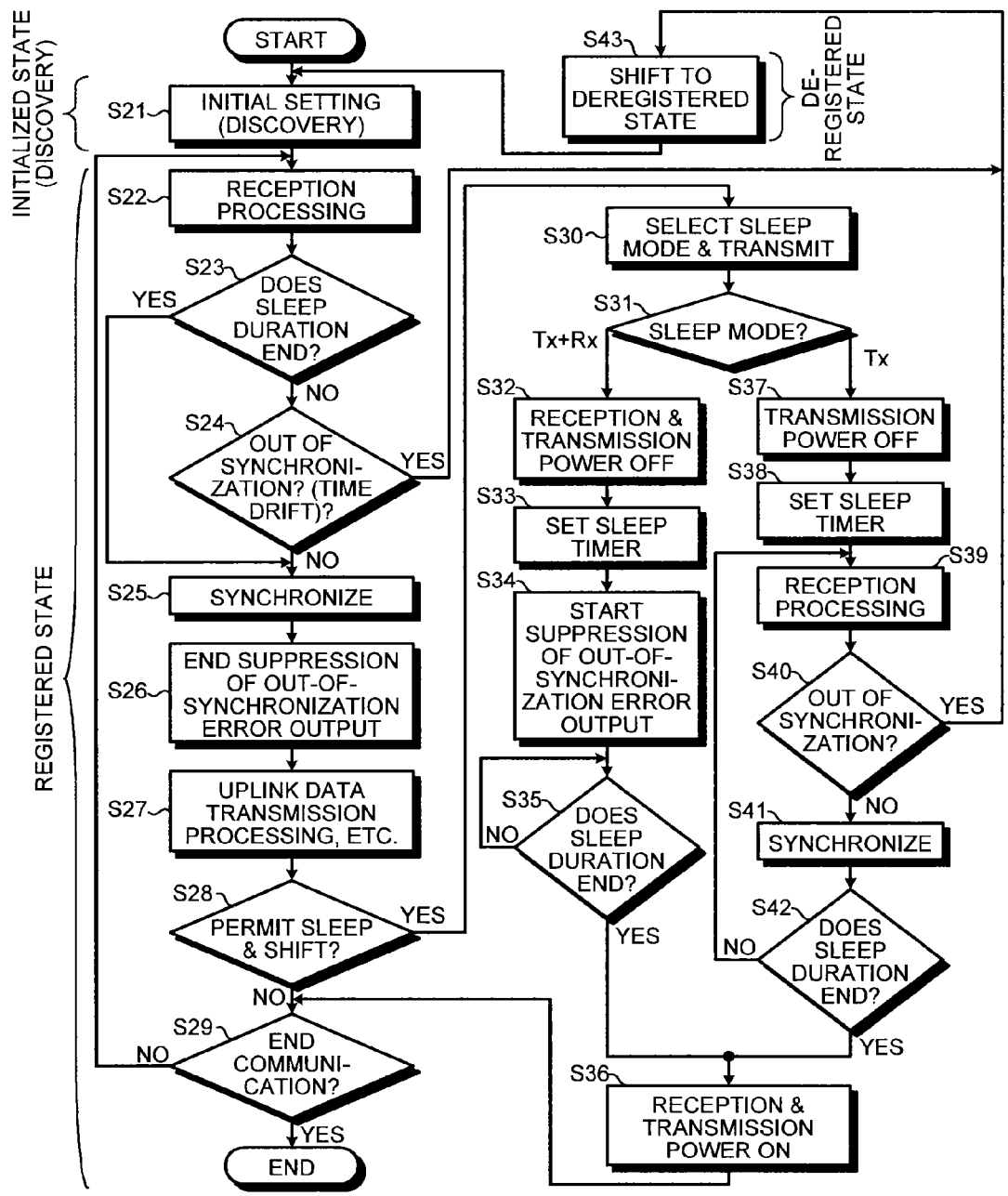
FIG. 11 is a flowchart for explaining communication control for a slave station apparatus in the second embodiment of the present invention.

The operation of the PON control unit 11, which is an example of the control device, is explained with reference to FIG. 11. The PON control unit 11 is a control device incorporated in a PON interface and is a processor formed as an IC chip (the same applies to the PON control unit 2). Processing shown in FIG. 11 is stored in the memory as a computer program executable by a computer. In FIG. 11, reference signs same as those in FIG. 5 denote the same or equivalent processing.

The ONU 10 according to this embodiment can select a power saving mode to be used out of power saving modes permitted by the OLT 1. When the PON control unit 11 determines the shift to the power saving state at step S28, the PON control unit 11 extracts the permitted modes from the power saving permission signal (the SLEEP_ALLOW message) and selects, based on, for example, the selection conditions for the power saving mode in [4] above, a mode to be used (step S30). Subsequently, the PON control unit 11 describes a code corresponding to the selected power saving mode in the affirmative response (SLEEP_ACK message) and transmits the affirmative response to the OLT 1.

Subsequently, the PON control unit 11 performs control explained below based on the selected power saving mode. When the PON control unit 11 performs power saving control concerning both of the transmission function and the reception function (step S32), the PON control unit 11 outputs, to the transceiver 14, a control signal for stopping power supply to light emitting elements and reception elements of the Tx 141 and the Rx 142. When the transceiver 14 receives the control signal, the transceiver 14 stops power supply to power supply lines connected to the elements. As explained in the first embodiment, other control is also effective for power saving of the ONU 10. Examples of the other control include control for reducing power consumption concerning other elements such as the reception buffer 13 and control for not only stopping power supply but also reducing an operating frequency.

The PON control unit 11 starts measurement of the sleep duration by the sleep timer 11e. When start time and length of the sleep duration are described in the SLEEP_ALLOW message, the sleep timer 11e can measures the sleep duration with measurement start timing adjusted to the start time.

Thereafter, as explained with reference to FIG. 5, the PON control unit 11 stays on standby in the power saving state until the sleep duration expires.

When Tx Sleep, i.e., a power saving mode for setting only the transmission function in the power saving state and maintaining the reception function is selected as the power saving mode, the PON control unit 11 selects circuits and components concerning the transmission function and performs the power saving control (step S37). Further, the PON control unit 11 starts measurement of the sleep duration by the sleep timer 11e as at step S33 (step S38).

In this mode, the Rx 142 and the reception buffer 13 are operating during the sleep duration. Therefore, the PON control unit 11 can perform reception processing for a downlink signal (step S39). Subsequently, the PON control unit 11 performs synchronization processing based on out-of-synchronization detection and a received signal (steps S40 and S41). Because transmission is suppressed during the sleep duration, the out-of-synchronization detection is not control that should always be carried out. In other words, the detection is control selectively adopted according to design. Therefore, at this step, the PON control unit 11 can also perform suppression processing for an out-of-synchronization error as at step S34.

When the synchronization processing ends, the PON control unit 11 determines whether the sleep duration expires (step S42) and continues the reception processing at steps S39 to S41 until the sleep duration expires. When the PON control unit 11 determines that the sleep duration expires, the PON control unit 11 stops the power saving control and performs power supply to the transmission function and the reception function as usual (step S36). The PON control unit 11 shifts to the transmission and reception processing at steps S22 to S29.

Third Embodiment

An embodiment in which a slave station requests a shift to the power saving state is explained.

In the communication sequence shown in FIG. 6, a start point of the sequence for shifting to the power saving state is present on the master station (OLT 1) side. On the other hand, a communication system according to this embodiment executes a communication sequence in which the slave station (the ONU 10) starts a power saving sequence as shown in FIG. 12.

Depending on states of use of the ONU 10, it is sometimes desired that the ONU 10 actively request a shift to the power saving state. The states of use are, for example, a halt instruction from a user of the ONU 10, an operation state of terminals such as a stop of the terminals 20-1 and 20-2 connected to the ONU 10, and occurrence of a power failure in a region where the ONU 10 is set. Conditions under which the ONU 10 shifts to the power saving state are various conditions like the selection condition examples (a) to (e) for the power saving state in [4] above and are not limited to specific conditions.

Figure 12:
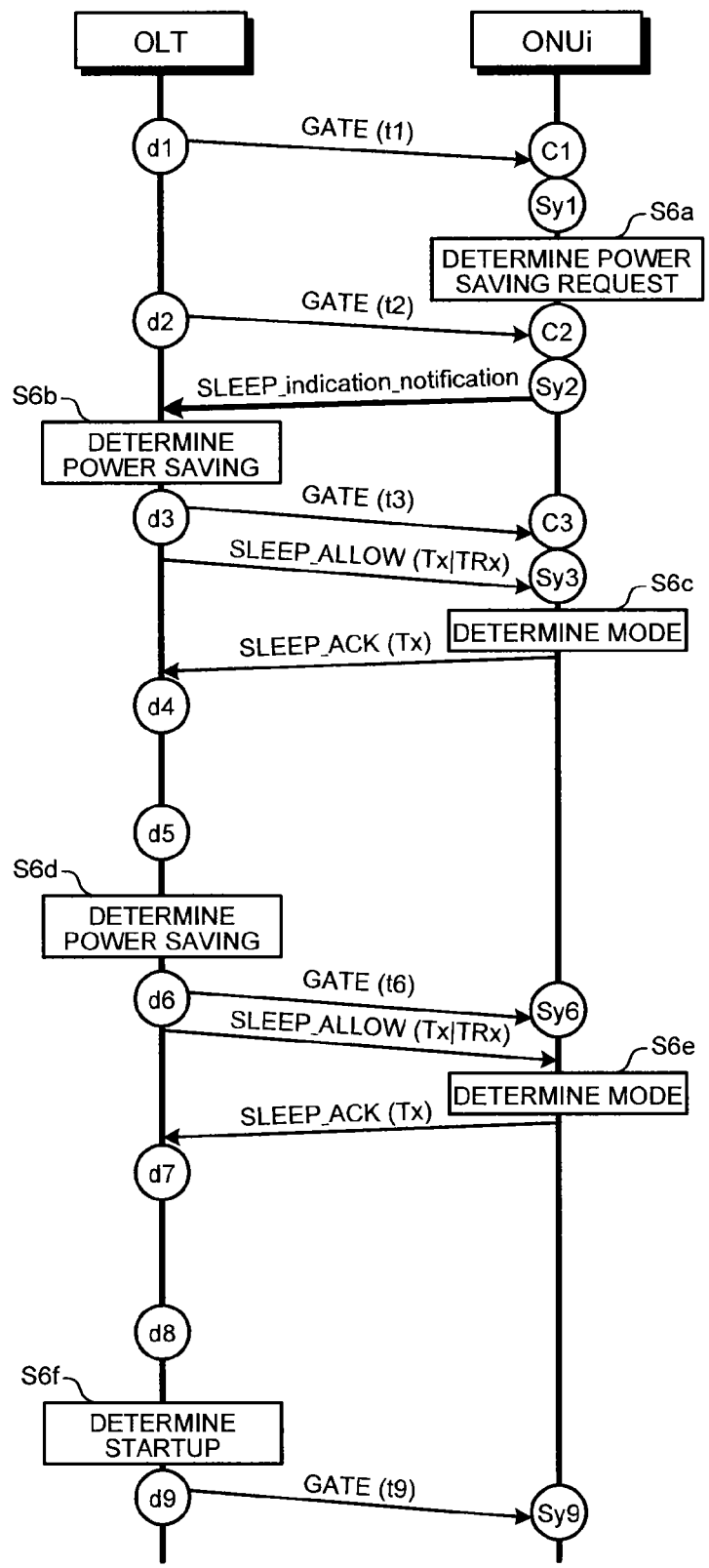
FIG. 12 is a sequence chart for explaining a communication method in a third embodiment of the present invention.
Figure 13:
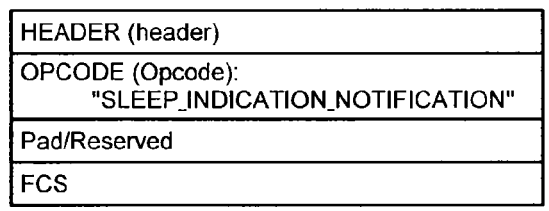
FIG. 13 is a diagram of a format of a sleep permission signal in the third embodiment of the present invention.

At step S6a in FIG. 12, the ONU 10 determines a shift to the power saving state and transmits a request signal (SLEEP_indication notification message) using a transmission bandwidth given from the OLT 1. FIG. 13 shows an example of a format of the request signal. The format of the request signal can be changed such that one or a plurality of codes of a requested power saving mode can be designated. In this case, the ONU 10 can designate in advance a power saving mode permitted by the OLT 1.

Figure 14:
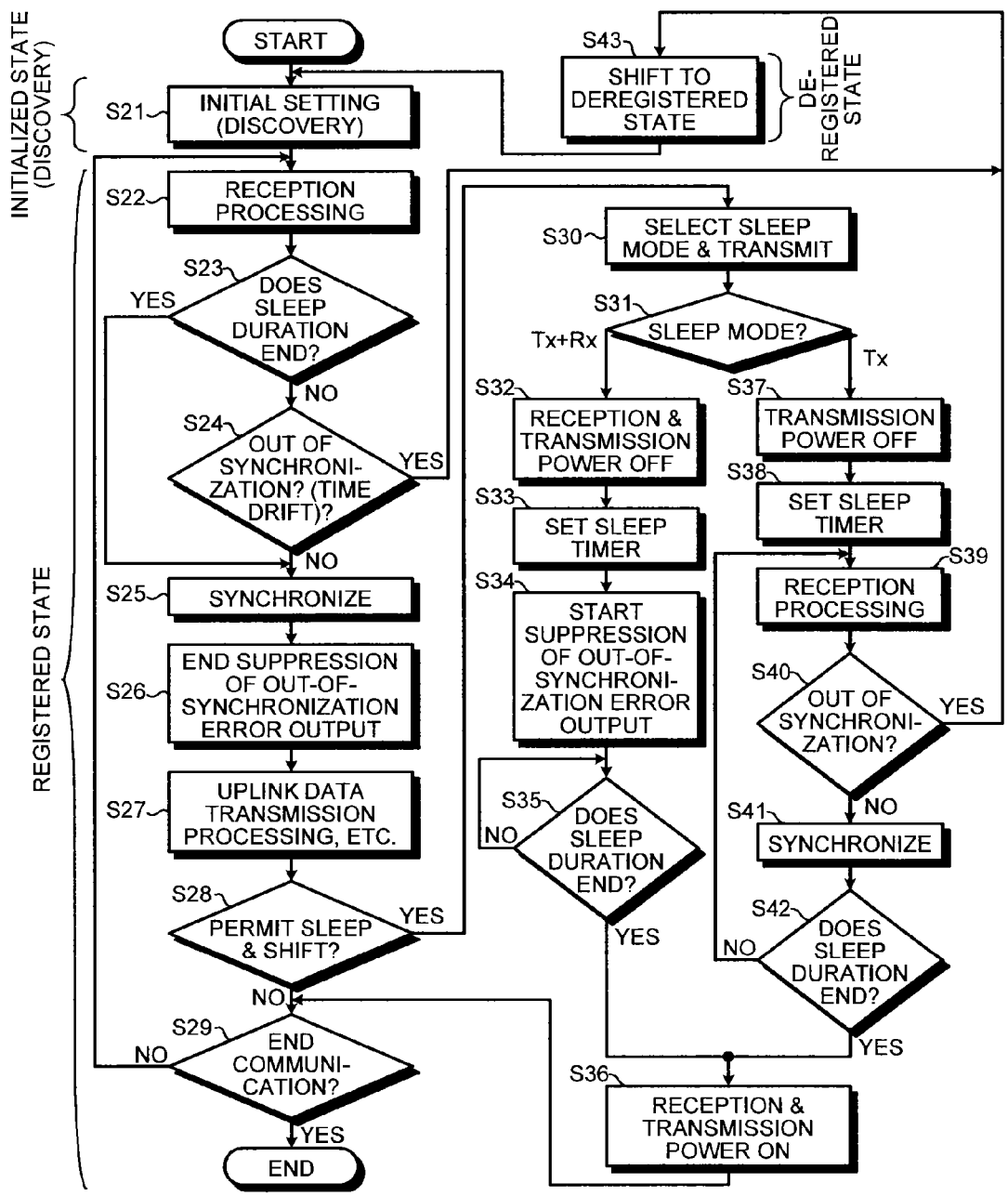
FIG. 14 is a flowchart for explaining communication control for a slave station apparatus in the third embodiment of the present invention.

FIG. 14 shows processing by the control device of the ONU 10 in transmitting a request signal. In processing at step S6a, the ONU 10 in the registered state determines whether to output the request signal as explained above and transmits the request signal using an uplink transmission bandwidth.

When the OLT 1 receives the request signal, at step S6b, the OLT 1 determines whether to give power saving permission to the ONU 10. When the OLT 1 determines to give the power saving permission to the ONU 10, the OLT 1 transmits the power saving permission signal (SLEEP_ALLOW). For example, when shift permission conditions in the case of the reception of the request signal are relaxed to make it easy to shift to the power saving state compared with the normal time, the communication system can execute power saving control adaptive to an actual demand. When the determination of the power saving permission by the OLT 1 is periodically performed, it is also possible to issue power saving permission early to the ONU 10 from which the request signal is received.

As a signal name of the request signal, a name other than SLEEP_indication notification can also be used. As the request signal, an extended OAM message, an extended MPCP message, or other control signals can be used.

Fourth Embodiment

An embodiment in which suppression control for an out-of-synchronization error is performed from the sleep duration to a predetermined period is explained. In the first embodiment, the ONU 10 performs the synchronization processing after the end of the sleep duration and then performs the suppression release processing for an out-of-synchronization error (see steps S25 and S26 of FIG. 5). Besides such control, any method can be used as long as the method is control that can suppress the ONU 10 from changing to the deregistered state because of a synchronization problem after the end of the sleep duration.

Figure 15:
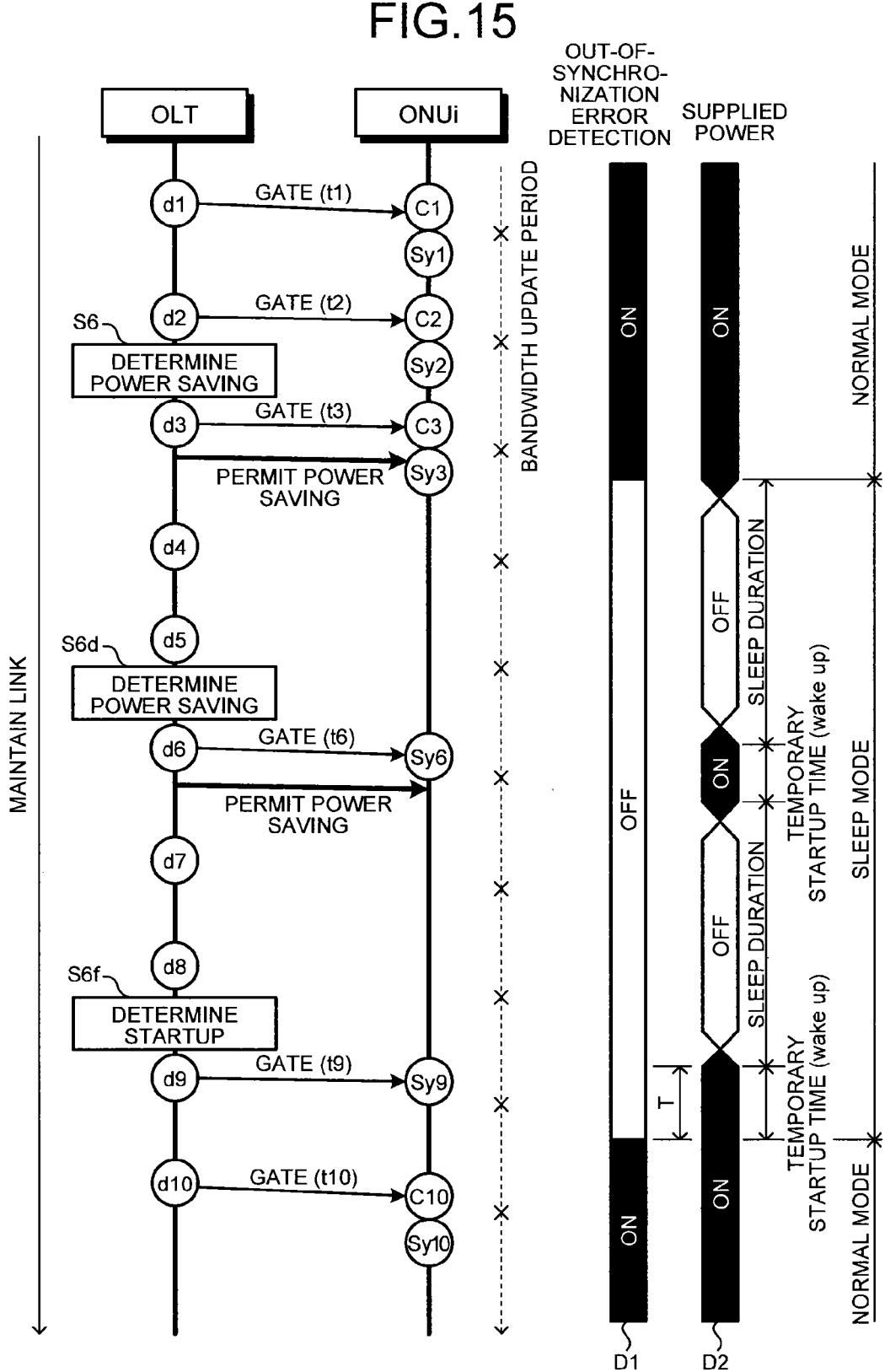
FIG. 15 is a sequence chart for explaining a communication method in a fourth embodiment of the present invention.
Figure 16:
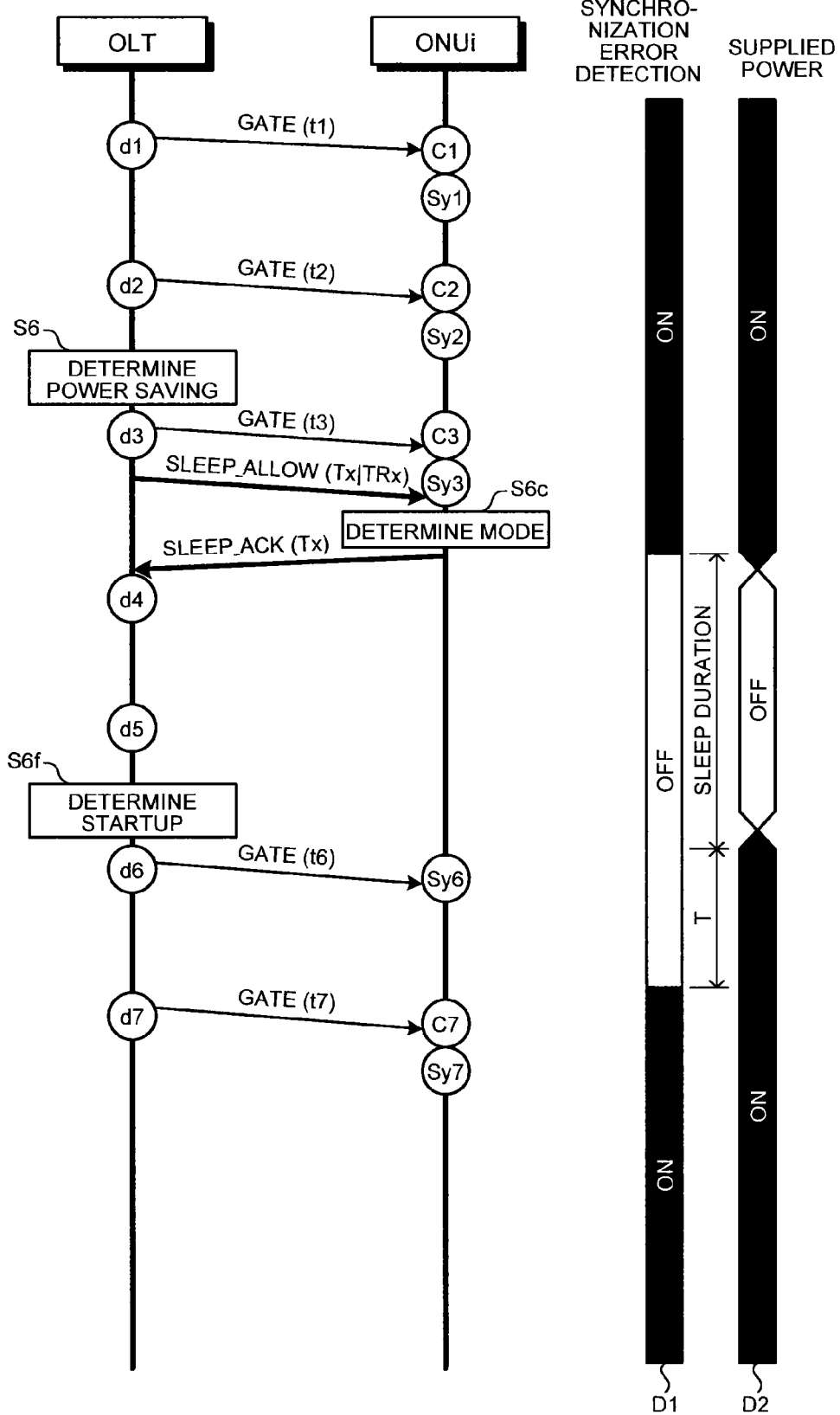
FIG. 16 is a sequence chart for explaining the communication method in the fourth embodiment of the present invention.

FIGS. 15 and 16 show a control method in which end timing of the suppression control is the time when a fixed time T elapses immediately after the end of the sleep duration. In FIG. 15, reference signs same as those in FIG. 3 denote the same or equivalent sections. In FIG. 16, reference signs same as those in FIG. 6 denote the same or equivalent sections. It is needless to say that the same processing can be applied in the communication sequence shown in FIG. 12.

The suppression time T immediately after the end of the sleep duration is time in which a shift to the deregistered state due to an out-of-synchronization error can be suppressed. Time that does not cause a significant trouble in synchronization in communication in the power saving state is set as the suppression time T.

Measurement of the suppression control can be executed by designing a timer to start time measurement at the start of the sleep duration and expire when the length of the sleep duration+the suppression time T elapses from the start of the time measurement. The measurement of the time is not limited to this method. A method can also be adopted in which the timer starts the measurement when the sleep duration ends and the timer expires when the suppression time T elapses. Further, the measuring method can be any method as long as the same result is obtained. The timer can be a timer exclusive for the out-of-synchronization suppression control or can be a timer used as other timers as well. The suppression time T can be set in a bandwidth update period after the end of the sleep duration.

Figure 17:
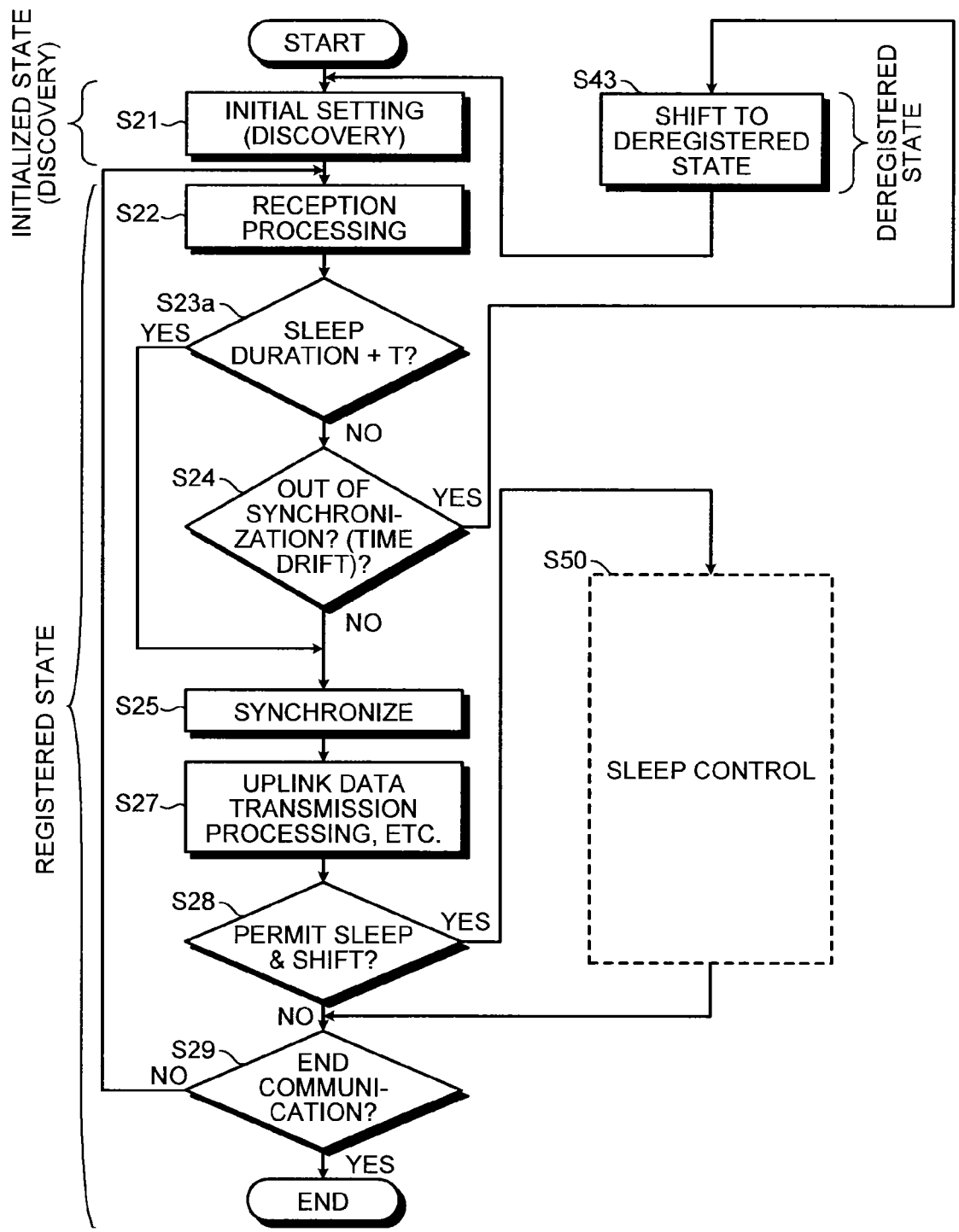
FIG. 17 is a flowchart for explaining communication control for a slave station apparatus in the fourth embodiment of the present invention.

FIG. 17 shows a flowchart of the control device that performs the processing explained above. In FIG. 17, reference signs same as those in FIG. 5, 11, or 14 denote the same or equivalent processing. At step S23a in FIG. 17, the PON control unit 11 detects, for example, with the timer, whether the suppression time T elapses from immediately after the end of the sleep duration. Before the elapse of the period, i.e., when the present time is in the suppression period, the PON control unit 11 skips the out-of-synchronization detection processing at step S24 and shifts to step S25. In the outside of the suppression period, the PON control unit 11 performs the out-of-synchronization detection processing (step S24).

Step S50 is sleep processing, which is the same processing as steps S30 to S42 in FIG. 5, 11, or 14. In the processing shown in FIG. 17, the end processing for the output suppression for an out-of-synchronization error (step S26) in FIG. 5, 11, or 14 is omitted. Therefore, the start processing for the output suppression processing for an out-of-synchronization error (step S34) in the figure corresponding to the end processing can also be omitted.

The embodiments of the present invention are explained above. The invention is not limited to the embodiments. Any modifications can be made without departing from the spirit of the present invention. For example, a communication system to which the communication method is applied does not need to be the PON system. The communication method can also be applied to an optical communication system in which an active element is used. The communication system is not limited to optical communication. The communication method can also be applied to a communication system that performs communication between terminals using an electric signal.

INDUSTRIAL APPLICABILITY

The present invention is suitable for a communication method and a communication system in which power saving is necessary.

REFERENCE SIGNS LIST

1 OLT
2 PON control unit
3, 13 reception buffers
4, 12 transmission buffers
5, 14 transceivers
6 WDM
7 PHY
10-1 to 10-3 ONU
11 PON control unit
20-1, 20-2 terminals
30 subscriber line
40 splitter
51, 142, 161-1, 161-2 Rxs
52, 141, 162-1, 162-2 Txs

The invention claimed is:

1. A communication method for an optical communication system that connects a plurality of user-side optical line terminal apparatuses (hereinafter referred to as ONUs) to a station-side optical line terminal apparatus (hereinafter referred to as OLT) using a common optical fiber, the communication method comprising:

a step of the ONU in a deregistered state staying on standby until the ONU is registered in the OLT;

a discovery step of the OLT discovering the ONU in the deregistered state connected to the OLT via the optical fiber and registering the ONU as the ONU in a registered state;

a communication step of the ONU that receives a synchronization signal monitoring out of synchronization by comparing the synchronization signal and a time of the ONU and, when the out of synchronization is detected, returning to the deregistered state and stopping transmission; and a power saving step of the ONU intermittently executing power saving control for stopping or reducing power supply to a transmitter or a receiver for a predetermined pause duration while maintaining a communication link in the communication step, wherein after the pause duration, the ONU temporarily suppresses a shift to the deregistered state due to detection of the out of synchronization.

2. The communication method for the optical communication system according to claim 1, wherein the power saving step includes:

a step of the ONU transmitting a request signal for requesting a shift to a power saving state;

a permission step of the OLT that receives the request signal transmitting a sleep permission signal designating a power saving mode to be permitted; and a step of the ONU that receives the sleep permission signal controlling power supply to the transmitter or the receiver according to the permitted power saving mode.

3. The communication method for the optical communication system according to claim 2, wherein a plurality of the power saving modes are designated in the sleep permission signal, and the ONU selects the power saving mode to be used out of the power saving modes designated in the sleep permission signal.

4. The communication method for the optical communication system according to claim 3, wherein the ONU transmits a sleep response signal to the OLT designating the selected power saving mode.

5. The communication method for the optical communication system according to claim 1, wherein the power saving step includes:

a permission step of the OLT transmitting a sleep permission signal designating a plurality of power saving modes to be permitted; and a step of the ONU that receives the sleep permission signal selecting the power saving mode to be used out of the permitted power saving modes and controlling the power supply to the transmitter or the receiver.

6. The communication method for the optical communication system according to claim 2, wherein the sleep permission signal has information concerning the pause duration, and the ONU suppresses the shift to the deregistered state due to the detection of the out of synchronization according to the information concerning the pause duration.

7. The communication method for the optical communication system according to claim 1, wherein, when the ONU receives the synchronization signal from the OLT when suppressing the shift to the deregistered state due to the detection of the out of synchronization, the ONU synchronizes the time of the ONU with the received synchronization information and releases the suppression.

8. The communication method for the optical communication apparatus according to claim 1, wherein the ONU suppresses, in the pause duration, the shift to the deregistered state due to the detection of the out of synchronization.

9. The communication method for the optical communication apparatus according to claim 1, wherein, in the power saving step, the ONU suppresses the detection of the out of synchronization to suppress the shift to the deregistered state due to the detection of the out of synchronization.

10. The communication method for the optical communication system according to claim 1, wherein the communication step repeats steps (a) to (c) below:
 (a) the OLT transmitting a bandwidth allocation signal having the synchronization signal to the ONU in the registered state,
 (b) the ONU that receives the bandwidth allocation signal monitoring out of synchronization by comparing the synchronization signal included in the bandwidth allocation signal and the time of the ONU and, when the out of synchronization is detected, returning to the deregistered state and stopping transmission, and
 (c) the ONU in the registered state synchronizing the time with the synchronization signal and transmitting a signal based on the bandwidth allocation signal.

11. A slave station apparatus comprising:
 a transmitter;
 a receiver; and
 a control device configured to control a sleep mode for stopping or reducing power consumption of at least one of the transmitter and the receiver for a predetermined sleep duration, wherein
 the control device detects a difference between a time stamp of an MPCPDU (Multi-Point Control Protocol Data Unit) received from a master station apparatus and a local time measured by the control device, when the difference exceeds a value set in advance, detects a time stamp drift error and shifts to a deregistered state for waiting for resetting of a logical link by the master station apparatus, and, when resuming transmission and reception after the sleep duration in the sleep mode, temporarily suppresses a shift to the deregistered state due to the time stamp drift error.

12. The slave station apparatus according to claim 11, further comprising a clock configured to measure the local time, wherein
 the control device synchronizes the local time measured by the clock with the received time stamp of the MPCPDU.

13. The slave station apparatus according to claim 11 or 12, wherein
 the receiver receives, from the master station apparatus, a sleep permission signal having a signal form for enabling designation of a plurality of the sleep modes to be permitted, and
 the control device selects the sleep mode to be used out of the sleep modes to be permitted and controls power consumption of at least one of the transmitter and the receiver.

14. The slave station apparatus according to claim 13, further comprising a timer configured to detect an end time of the sleep mode based on information concerning a sleep duration included in the sleep permission signal.

15. The slave station apparatus according to claim 11, wherein, when the control device receives the time stamp from the master station apparatus when suppressing the shift to the deregistered state due to the time stamp drift error, the control device synchronizes the local time of the ONU with the received time stamp and releases the suppression.

16. The slave station apparatus according to claim 11, wherein the control device suppresses, during the sleep mode, the shift to the deregistered state due to the time stamp drift error.

17. The slave station apparatus according to claim 11, wherein the control device suppresses the detection of the time stamp drift error in the sleep mode to suppress the shift to the deregistered state due to the time stamp drift error.

18. An optical communication system that connects a plurality of user-side optical line terminal apparatuses (hereinafter referred to as ONUs) to a station-side optical line terminal apparatus (hereinafter referred to as OLT) using a common optical fiber, wherein
 the OLT transmits a synchronization signal to the ONU in a registered state, and
 the ONU includes:
 a transmitter;
 a receiver;
 a power-saving control unit configured to intermittently repeat power saving control in which the ONU stops or reduces power supply to the transmitter or the receiver for a predetermined pause duration while maintaining a communication link;
 a monitoring unit configured to monitor out of synchronization by comparing the received synchronization signal and a time of the ONU; and
 a control unit configured to shift from the registered state to a deregistered state when the monitoring unit detects the out of synchronization, and, on the other hand, after the pause duration of the power saving control, suppress the shift to the deregistered state due to the detection of the out of synchronization.

19. The optical communication system according to claim 18, wherein, when the control unit receives the synchronization signal from the OLT when suppressing the shift to the deregistered state due to the detection of the out of synchronization, the control unit synchronizes the time of the ONU with the received synchronization signal and releases the suppression.

20. The optical communication system according to claim 18, wherein the control unit suppresses, in the pause duration, the shift to the deregistered state due to the detection of the out of synchronization.

21. A control device of a user-side optical line terminal apparatus (hereinafter referred to as ONU) connected to a station-side optical line terminal apparatus (hereinafter referred to as OLT) using an optical fiber, the control device comprising:
 a power-saving control unit configured to intermittently repeat power saving control in which the ONU stops or reduces power supply to the transmitter or a receiver for a predetermined pause duration while maintaining a communication link;
 a monitoring unit configured to monitor out of synchronization by comparing a synchronization signal received from the OLT and a time of the ONU; and
 a control unit configured to shift from a registered state to a deregistered state when the monitoring unit detects the out of synchronization, and, on the other hand, after the pause duration of the power saving control, suppress the shift to the deregistered state due to the detection of the out of synchronization.

22. The control device according to claim 21, wherein, when the control unit receives the synchronization signal from the OLT when suppressing the shift to the deregistered state due to the detection of the out of synchronization, the control unit synchronizes the time of the ONU with the received synchronization signal and releases the suppression.

23. The control device according to claim 21, wherein the control unit suppresses, during the power saving control, the shift to the deregistered state due to the detection of the out of synchronization.

24. A computer readable medium contain computer program commands that causes a computer of a slave station apparatus to execute sleep control for intermittently stopping or reducing power consumption of at least one of the transmitter and the receiver, the computer program commands causing the computer to execute:

detecting a difference between a time stamp of an MPCPDU (Multi-Point Control Protocol Data Unit) received from a master station apparatus by the receiver and a local time measured by the slave station apparatus;

detecting, when the difference exceeds a value set in advance, a time stamp drift error and shifting to a deregistered state for stopping transmission by the transmitter and waiting for resetting of a logical link by the master station apparatus; and returning from the sleep control and supplying electric power to the transmitter and the receiver; and temporarily suppressing, in a period after a sleep duration of the sleep control, a shift to the deregistered state due to the time stamp drift error.

\* \* \* \* \*